United States Patent [19]

Lee et al.

[11] Patent Number: 5,010,504

[45] Date of Patent: * Apr. 23, 1991

[54] DIGITAL IMAGE NOISE SUPPRESSION METHOD USING SVD BLOCK TRANSFORM

[75] Inventors: Hsien-Che Lee; Hui-Jung Lee, both of Penfield; Heemin Kwon, Pittsford; Jeanine Liang, Rochester, all of N.Y.

[73] Assignee: Eastman Kodak Company, Rochester, N.Y.

[*] Notice: The portion of the term of this patent subsequent to Jul. 31, 2007 has been disclaimed.

[21] Appl. No.: 435,490

[22] PCT Filed: Feb. 22, 1988

[86] PCT No.: PCT/US88/00519
§ 371 Date: Oct. 12, 1989
§ 102(e) Date: Oct. 12, 1989

[87] PCT Pub. No.: WO89/07799
PCT Pub. Date: Aug. 24, 1989

[51] Int. Cl.$^5$ ............................................. H03F 1/26
[52] U.S. Cl. ................................... 364/574; 358/166; 358/167; 382/51
[58] Field of Search ............... 364/553, 554, 574, 725, 364/727; 358/166, 167, 282, 284; 455/305; 382/43, 51, 54

[56] References Cited

U.S. PATENT DOCUMENTS

| | | | |
|---|---|---|---|
| 4,055,756 | 10/1987 | Jolivet et al. | 364/727 X |
| 4,179,709 | 12/1979 | Workman | 358/133 |
| 4,242,705 | 12/1980 | Ebihara | 358/167 |
| 4,246,610 | 1/1981 | Takahashi | 358/167 |
| 4,442,454 | 4/1984 | Powell | 358/167 |
| 4,549,212 | 10/1985 | Bayer | 364/727 X |
| 4,553,165 | 11/1985 | Bayer | 358/167 |
| 4,590,608 | 5/1986 | Chen et al. | 382/43 |
| 4,648,120 | 3/1987 | Chittineni | 382/27 X |
| 4,672,437 | 6/1987 | Casper | 358/106 X |
| 4,710,822 | 12/1987 | Matsunawa | 382/51 |
| 4,817,180 | 3/1989 | Cho et al. | 382/54 |

Primary Examiner—Joseph L. Dixon
Attorney, Agent, or Firm—Thomas H. Close

[57] ABSTRACT

A block transform image processing method employs singular value decomposition to reduce noise without affecting texture and edge detail. A nonlinear gain function based on the measured statistics of the singular values for image noise is generated. The image is filtered to produce a detail image and a low pass filtered image. The detail image is divided into blocks and the blocks are transformed to produce singular vectors and arrays of singular values. The nonlinear gain function is applied to the arrays of singular values and an inverse SVD transform is applied to the modified singular values to produce a processed detail image. The processed detail image is combined with the low pass filtered image to produce a processed image having reduced noise.

8 Claims, 11 Drawing Sheets

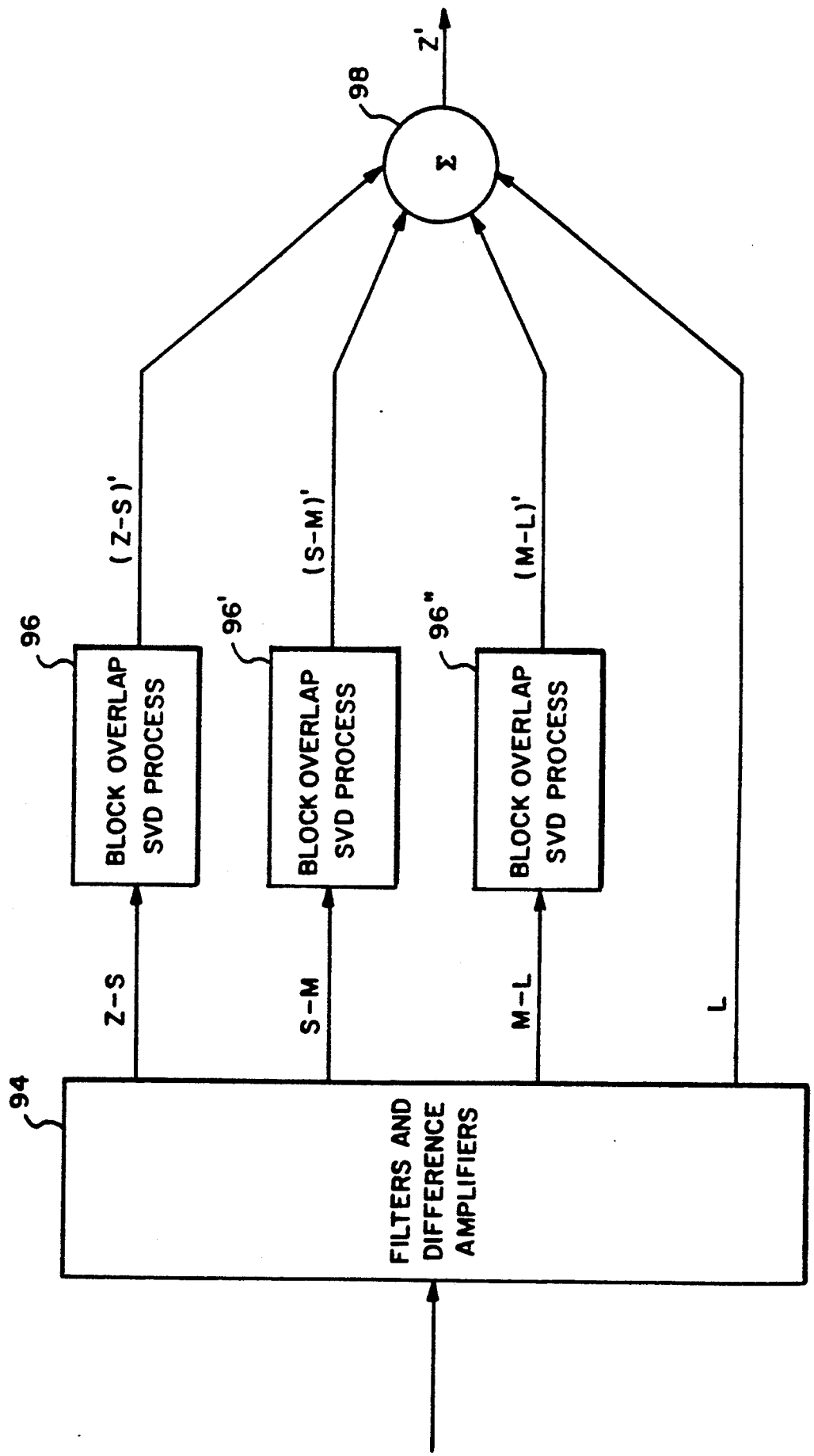

DIGITAL IMAGE NOISE SUPPRESSION METHOD USING SVD BLOCK TRANSFORM

TECHNICAL FIELD OF THE INVENTION

The invention relates to block transform digital image processing methods for reducing noise in a digital image.

BACKGROUND OF THE INVENTION

U.S. Pat. No. 4,553,165, issued Nov. 12, 1985 to Bayer discloses a block transform image processing method for removing noise (such as film grain noise) from a digital image, produced for example by scanning a photographic image. According to the method disclosed by Bayer, the digital image is divided into blocks. Each block is transformed, for example by Walsh Hadamard transformation, to yield blocks of transform coefficients. The transform coefficients are modified in a nonlinear manner to reduce the noise in the image block, and the blocks of modified coefficients are inversely transformed to yield the processed image having reduced noise. The effect of this processing is to reduce the appearance of noise in the processed image while avoiding the introduction of an artifact caused by other prior art noise reduction processes in which false "edges" would appear in smooth areas of the the processed image (such as facial features).

While the technique disclosed by Bayer is indeed effective to avoid the appearance of false edges, while reducing the appearance of noise in the processed image, extensive testing by the present inventors of the image processing method employing the Walsh-Hadamard transformation has revealed the presence of another class of undesirable artifacts in the processed images that is not effectively avoided by the Walsh-Hadamard block transformation noise reduction method. These artifacts occur in areas of the image having fine texture, whereby the texture is replaced by smooth appearing areas. This artifact is particularly noticeable and objectionable in such image features as grass, hair, and textile patterns such as carpet. Careful investigation has also shown that the Bayer method somewhat reduces the sharpness of edge detail.

SUMMARY OF THE INVENTION

It is therefore the object of the present invention to provide a block transform image processing method that avoids the shortcomings noted above. In arriving at the present invention, we found it helpful to consider the statistical properties of the noise being removed from an image, and the statistical properties of the image details such as texture and edges that were to be preserved in the processed image. In particular, we examined the statistical properties of the noise and image detail in the transformed coordinate space. For a spatial transformation of the Walsh-Hadamard type, a transform coefficient of the noise is characterized by a generally Gaussian distribution around a mean value of zero. This is shown by Curve 10 in FIG. 2. The transform coefficients of the picture detail, including edges and texture, form a generally Lapacian distribution, also centered about zero (shown by Curve 12 in FIG. 2.)

The transform coefficients from the picture detail have generally higher amplitude in absolute terms than the ones From the noise. Noise suppression is achieved by thresholding the transform coefficients or by modifying them through a non linear gain function. This will remove most of the noise but unfortunately it will remove the low amplitude transform coefficients from the image detail which will create artifacts. The artifacts are most noticeable and objectionable in low contrast, fine textured area.

We also examined the variance distributions of the image components such as noise, texture, and edges, and noted that there was a much better separation of the statistics of the image components when plotted against variance of small regions. FIG. 3 is a graph showing variance plotted against distribution (number of occurrances) for film grain noise (Curve 1), texture (Curve 16), and edge detail (Curve 18) for a typical digital image produced by scanning a photograph.

It will be appreciated from a comparison of FIG. 2 with FIG. 3, that a noise reduction technique that discriminates based upon the variances of image detail will have a much better chance of reducing noise without affecting texture extensively. We also came to realize that there exists an image transformation called singular value decomposition (SVD) that decomposes an image into a set of singular vectors and singular values that are closely analagous to the concept of principal component analysis in statistics. This can be appreciated from the following analysis.

If an $m \times n$ matrix is treated as a set of n m dimensional column vectors and the mean column vector is set to zero by subtracting it from every column vector of the matrix, then the singular values of the resulting matrix are the square roots of the variances of the m vector components in a rotated space. The rotated space is such that there is no correlation between any two components of the sample vectors in the rotated space. The distribution of the singular values for noise is a slowly decreasing function when they are ordered in decreasing order. The distribution of the singular values for the picture detail will be quite different from the noise. Also, the singular values for the picture detail will be much higher than those of the noise. And as mentioned above, discrimination of the noise from the picture detail will be much better.

Armed with these insights we proceeded to develop a block transformation digital image processing method for reducing noise in an image employing singular value decomposition as the transformation. According to the method of the present invention, a digital image is processed in a computer to remove noise by performing the following steps. First a non linear gain function is produced based upon the measured statistics of the singular values of the noise in the image. A detail image and a low pass filtered image are produced from the digital image to be processed. The detail image is divided into blocks and the blocks are transformed into singular vectors and a diagonal array of singular values. The non linear gain function is applied to the singular values to produce an array of modified singular values. An inverse SVD transform is performed on the singular vectors and the modified singular values to produce blocks of processed detail image values. Finally, the processed detail image is added to the low pass image to generate a processed image having reduced noise.

BRIEF DESCRIPTION OF THE DRAWINGS

FIGS. 10a-10c are diagrams showing the values of the coefficients employed in the digital filters shown in FIG. 9;

FIG. 11 is a diagram showing a digital image processing method according to the present invention employing block overlap and a plurality of spatial frequency band pass image signals;

MODES OF CARRYING OUT THE INVENTION

The digital image signal referred to in the following description is generated by scanning and sampling an original image. For purposes of describing the preferred embodiments, the input signal is generated from a photographic negative or transparency. The digital image signal represents a variety of spatial components of the image, including an average brightness level, fine detail such as lines and textures, intermediate detail such as small features, and coarse details such as shading on smooth surfaces and other gradually varying features. In addition, the signal includes a noise component affecting most of the spatial components of the image to some degree.

With a photographic negative or transparency, much of the noise is film grain noise. While the invention will be described in connection with sampled data from a photograph, it should be understood that the input signal can represent other information or data such as would be derived from directly scanning an object, from a composite video signal or from image information stored in optical or magnetic storage media. In such cases, the noise may originate in other characteristics of the image signal generating system. Since the singular values measure correlations, the method can remove noise originating from a wide variety of noise sources.

Figure 1:
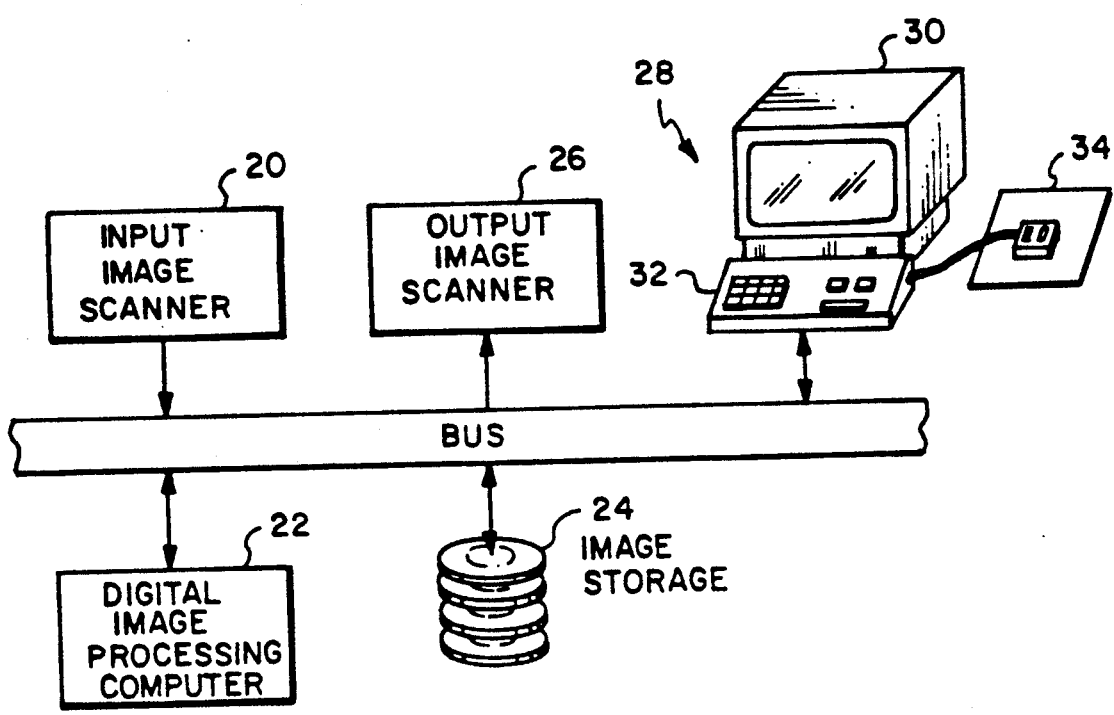
FIG. 1 is a schematic diagram showing a digital image processing system suitable for practicing the method of the present invention.
Figure 6:
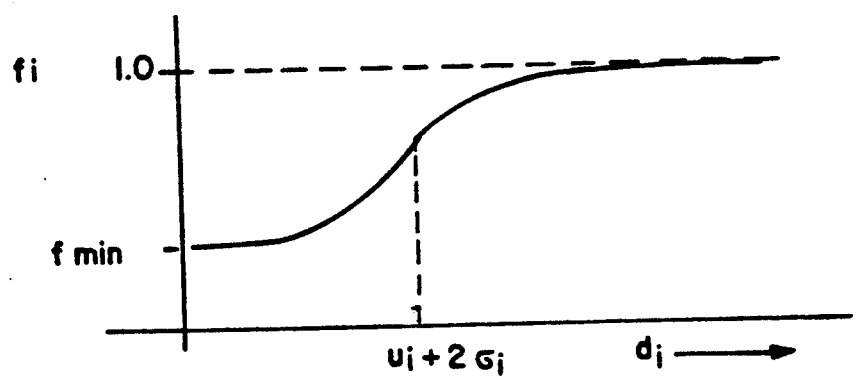
FIG. 6 is a graph showing the values of a typical table of factors generated according to the steps shown in FIG. 5.
Figure 2:
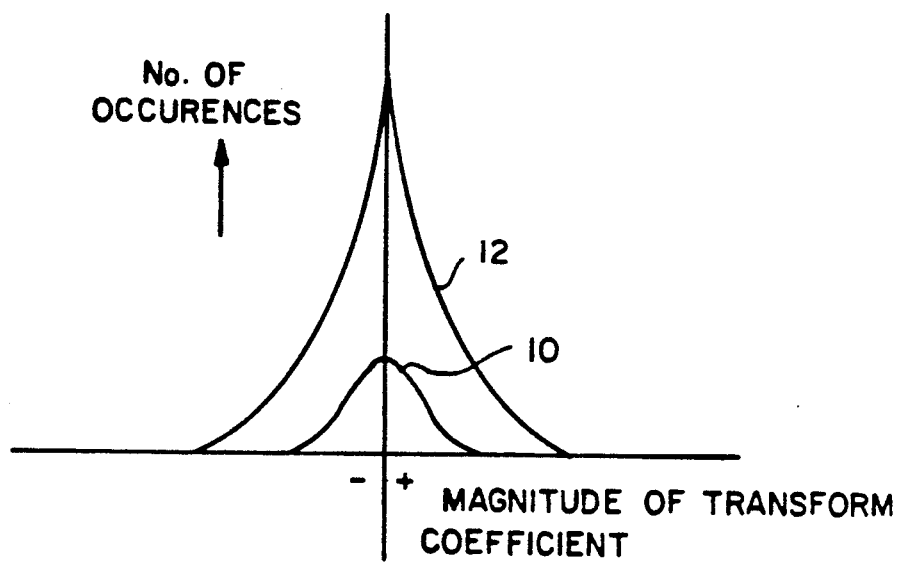
FIG. 2 is a graph useful in describing the statistics of image features processed according to the prior art.
Figure 3:
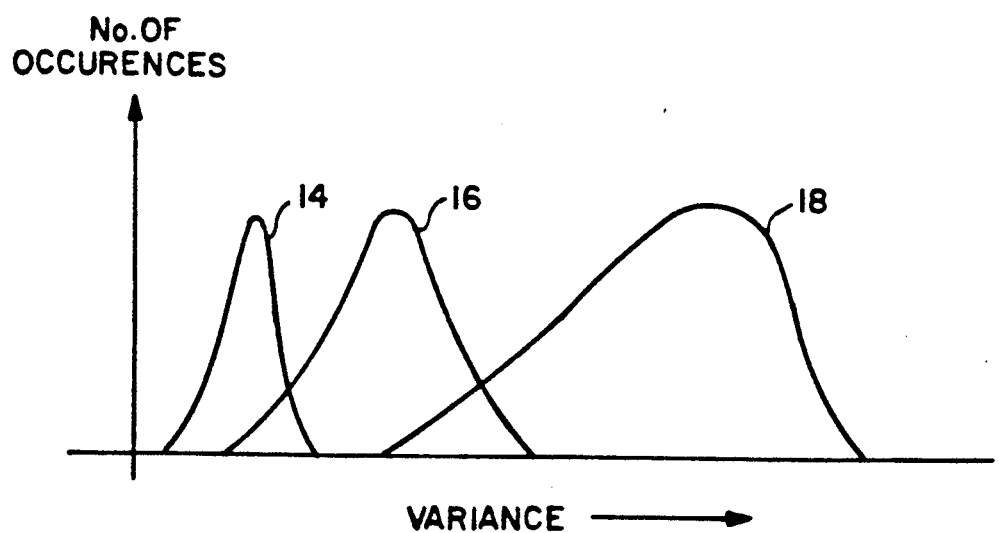
FIG. 3 is a graph useful in describing the statistical features of an image processed according to the present invention.

FIG. 1 is a schematic diagram showing a digital image processing facility useful for practicing the present invention. The digital image processing facility includes an input image scanner 20, such as a CCD scanner or a graphic arts flat bed or drum scanner. A digital image signal generated by an input scanner 20 is processed by the digital image processing computer 22. The digital image processing computer 22 can be a general purpose digital computer, or a special purpose computer specifically designed for processing images e.g. a parallel multi-processor computer with 16 microprocessors and local memory. The original digital image from the scanner, and/or the processed digital image may be stored in a mass image storage memory 24, comprising for example magnetic or optical disk storage media.

The original and/or processed image may be displayed by means of an output image scanner 26, such as a CRT or laser film scanner. The system is controlled by an operator from a work station 28 such as the Sun work station manufactured and sold by Sun Microsystems Inc. The work station includes a CRT 30 for temporarily displaying an image, a keyboard 32, and graphics input device such as a mouse and graphics tablet 34.

Figure 4:
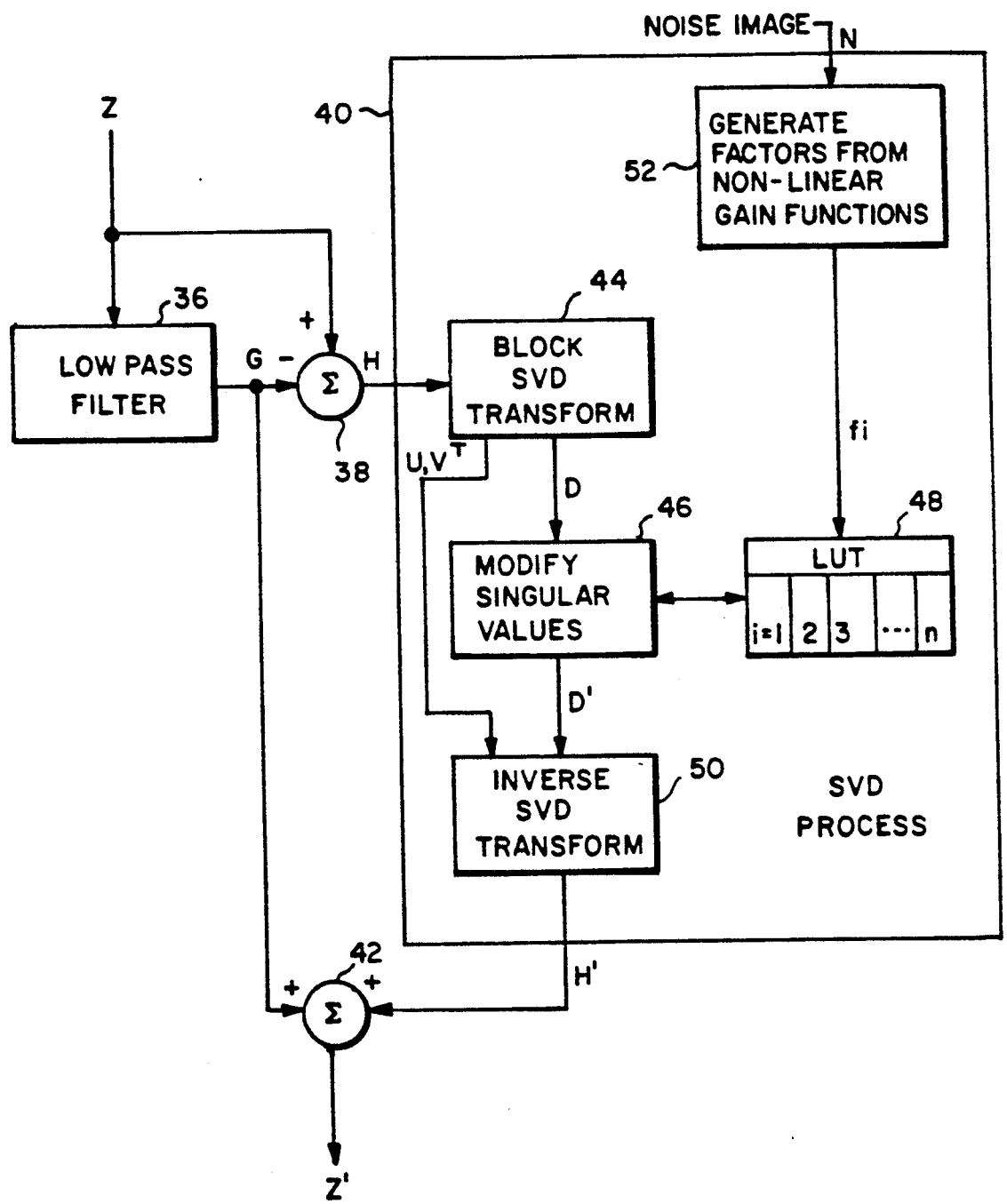
FIG. 4 is a block diagram illustrating the method of digital image processing according to the present invention.

FIG. 4 is a block diagram showing the major steps implemented by the image processing computer 22 in carrying out one mode of digital image processing according to the present invention. A low pass digital filter (e.g. a 31×31 pixel Gaussian Filter) is applied (36) to the digital image signal Z to produce a low pass digital image signal G. The low pass digital image signal G is subtracted (38) from the suitably delayed digital image signal Z to produce a detail image signal H. The detail image signal H is processed, employing SVD transformation (40), as described in detail below to produce a noise reduced detail signal H'.

In the SVD process, the detail image signal H is block SVD transformed (44) employing the well known SVD computer program described on pages 229 to 235 of the book: Computer Methods for Mathematical Computations by G. E. Forsythe, M. A. Malcolm, and C. B. Moler published by Prentice Hall Inc., Englewood Cliffs, N.J., 1977, to produce singular vector matrices U, $V^T$, and a diagonal matrix D of singular values $d_i$ arranged in order of descending amplitude where:

$$H = UDV^T, \quad (1)$$

where:
  H is an n×n sub block (e.g. 20×20 pixels) of the image,
  U contains the eigenvectors of $HH^T$,
  D is a diagonal matrix which contains singular values $d_1 d_2 \ldots d_{20}$ in order of descending amplitude, and
  V contains the eigenvectors of $H^TH$.

The singular values in array D are modified in a nonlinear fashion (46) by factor $f_i$ stored in lookup table (LUT) 48 to produce an array D' of modifed singular values. The generation of the factors stored in the lookup table 48 will be described in more detail below. The array of modifided singular values D' and singular vectors U, $V^T$ are inversely transformed (50) to produce a noise reduced detail signal.

Figure 5:
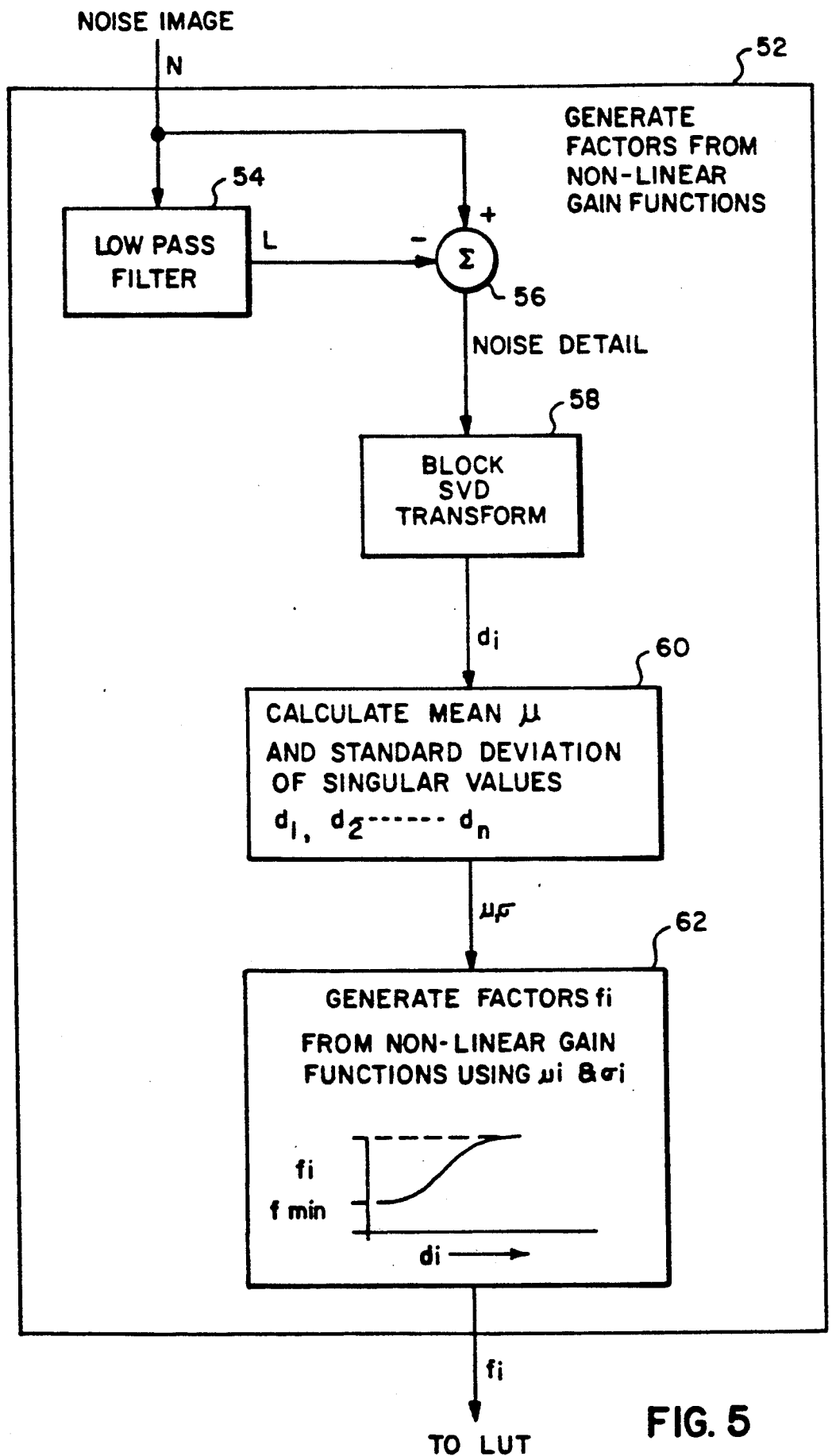
FIG. 5 is a block diagram illustrating the step of generating the table of factors described in FIG. 4.

The generation of the factors $f_i$ from a nonlinear gain function (52 in FIG. 4) will now be described with reference to FIG. 5. A digital noise image N generated for example by scanning a uniformly exposed and developed film is low pass filtered (54) for example by a 31×31 pixel Gaussian digital filter, to produce a low pass filtered noise image L.

The low pass filtered noise image L is subtracted (56) from the suitably delayed noise image N to produce a noise detail image signal. The noise detail image signal is block SVD transformed (58) to produce singular vectors and arrays of singular values $d_i$ for the noise image blocks. The singular values $d_i$ from each block of the transformed noise detail image are accumulated and the means $\mu_i$ and standard deviations $\sigma_i$ of the singular values in the respective positions of the the array are calculated (60) as follows:

$$\mu_i = \frac{1}{n} \sum_{j=1}^{n} d_{i,j} \tag{2}$$

$$\sigma_i = \frac{1}{n} \sum_{j=1}^{n} (d_{i,j} - \mu_i)^2, \tag{3}$$

where i is an index for the order of singular values, and j is an index for different blocks.

A factor $f_i$ for each singular value $d_i$ is then generated (62) by considering the following facts. The singular values of the noise will be centered at $\mu_i$ with standard deviation $\sigma_i$. The singular values of the shading areas of the image will have slightly higher values than those of the areas dominated by noise. The singular values of the textured areas of the image will have even higher values depending on the texture. The singular values of the edges in the image will have much higher values than those of the noise.

Considering the above, each singular value $d_i$, is multiplied by a factor $f_i$ through a non linear function $F(d_i, \mu_i, \sigma_i)$ defined as below to produce the output singular value d':

$$d'_i = f_i \cdot d_i, \text{ where } f_i = F(d_i, \mu_i, \sigma_i), \text{ and} \tag{4}$$

$$F(d_i, \mu_i, \sigma_i) = 1 - \frac{th2 \cdot \sigma_i}{d_i} -$$

$$\frac{\mu_i + th1 \cdot \sigma_i - th2 \cdot \sigma_i}{d_i} \exp\left[-a \cdot \left(\frac{d_i - \mu_i - th1 \cdot \sigma_i}{\sigma_i}\right)^p\right],$$

if $d_i \geq (\mu_i + th1 \cdot \sigma_i)$ and $F(d_i, \mu_i, \sigma_i) \geq 0$, = 0, otherwise.

The parameters a, p, and th1 are determined such that a good noise suppression in the shading and textured area is achieved The parameter th2 controls a threshold level when $d_i$ is large. The effect of the factor $f_i$ can be seen from the following discusions. When $d_i \leq (\mu_i + th1 \cdot \sigma_i)$. then the factor $f_i = 0$, and noise in the uniform area is suppressed. When $d_i >> (\mu_i + th1 \cdot \sigma_i)$, the factor $f_i$ approaches to $1 - (th2 \cdot \sigma_i/d_i)$. When this factor is multiplied by $d_i$, $d'_i = (d_i - th2 \cdot \sigma_i)$, resulting in some noise suppression in the edge region. The parameters a and p controls the curve shape for the transition between these two extremes The typical values for the parameters are: th1=3, th2=0 to 2, p=4, a=0.05.

The formula mentioned above is only one form of many possible non linear curve shapes that can be used as a factor for noise suppression. If one wants to remove noise partially, one could have the factor as follows:

$$F(d_i, \mu_i, \sigma_i) = fmin + (1 -$$

$$fmin) \cdot \left(1 - \exp\left[-a \cdot \left(\frac{d_i - \mu_i - th1 \cdot \sigma_i}{\sigma_i}\right)^p\right]\right),$$

if $d_i > (\mu_i + th1 \cdot \sigma_i)$; = fmin, if $d_i \leq (\mu_i + th1 \cdot \sigma_i)$.

where fmin is a constant chosen for the desired noise level reduction which has a value between zero and one. When fmin is equal to $$\left(\frac{1}{\sqrt{2}}\right)$$

the noise reduction provided by the present invention is equivalent to the improvement in film speed of 1 stop.

This function when applied to the singular values has an effect of thresholding the noise, reducing the singular values for shading area, and retaining textures and edges. The thresholding level and the curve shape depends on the artifacts one might tolerate.

The values $f_i$ of the nonlinear gain functions $F(d_i, \mu_i, \sigma_i)$ are calculated for each singular value $d_i$ to produce a table of factors $f_i$ for each singular value. The factors f are digitized in the form of look up tables and stored in look up table 48 shown in FIG. 4.

Figure 7:
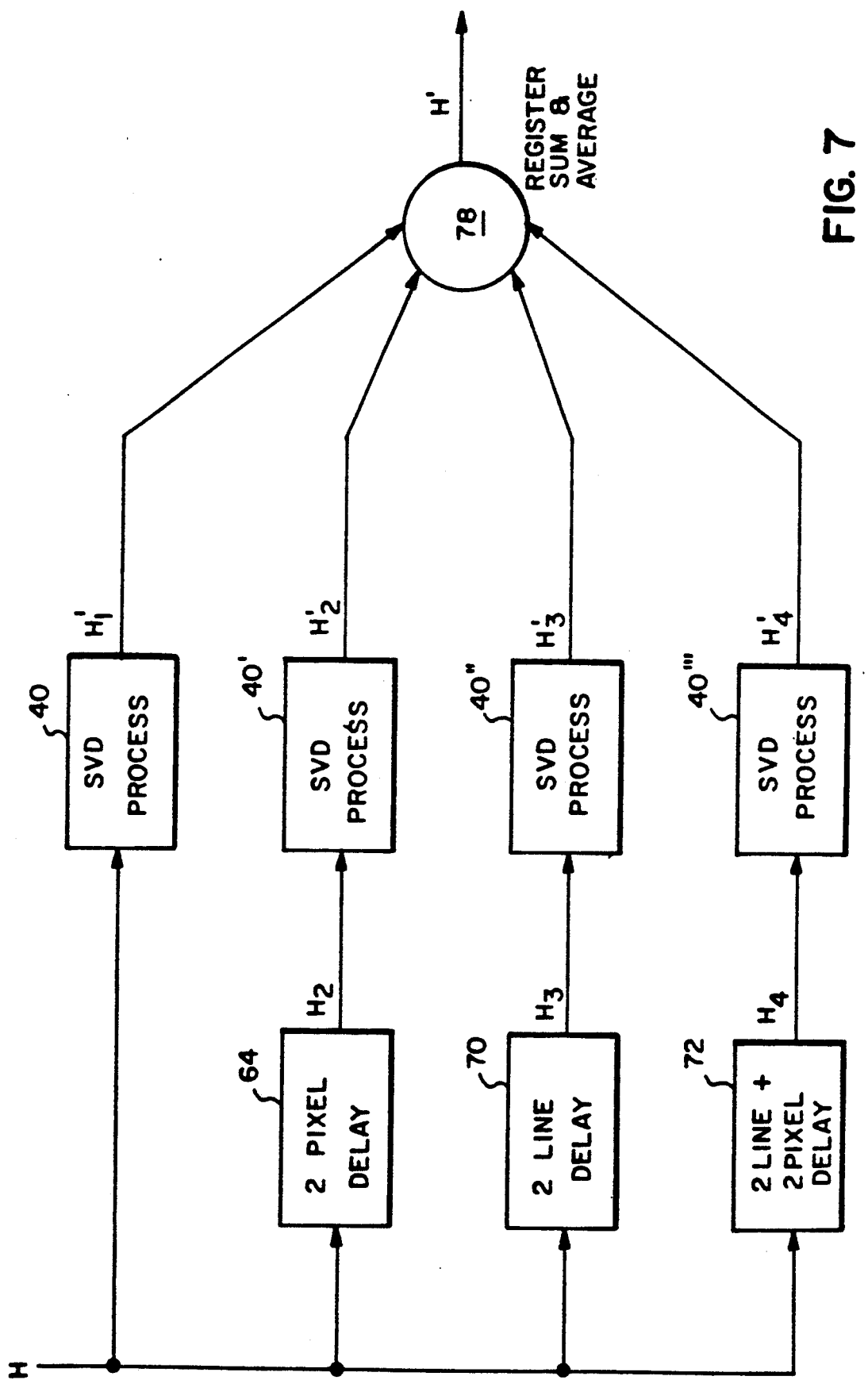
FIG. 7 is a block diagram showing a block overlap method of processing a digital image according to the present invention.

According to the presently preferred mode of practicing invention, the block SVD processing is performed using a moving average technique employing block overlap to reduce the appearance of blocking artifacts. FIG. 7 is a schematic block diagram showing the major steps involved in the block overlap SVD processing.

Figure 8:
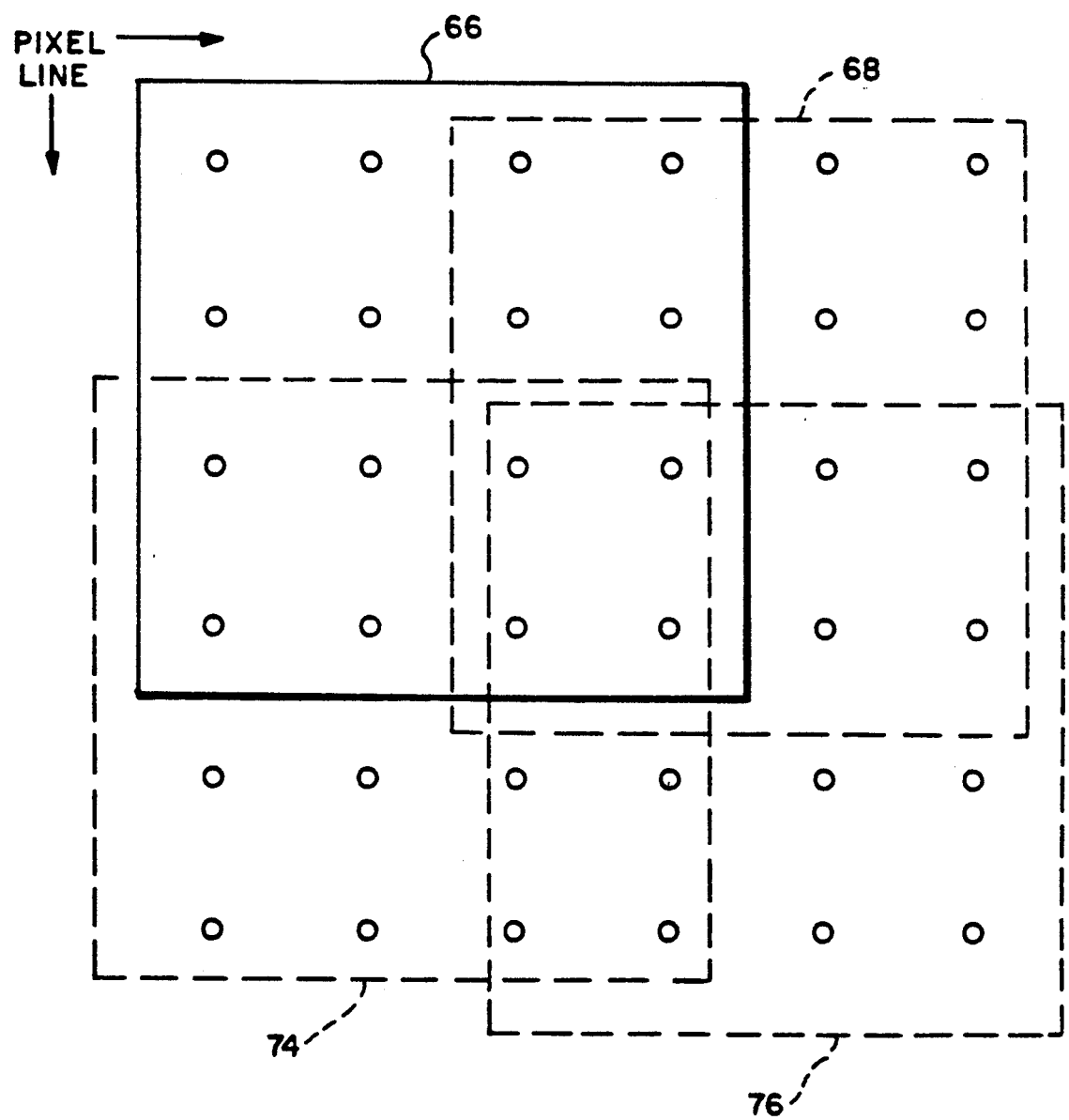
FIG. 8 is a diagram useful for describing the image processing method shown in FIG. 7.

For the purpose of simplifing the description, processing incorporating a 4×4 pixel block, with a 2 pixel step in the horizontal and vertical directions will be described. Such a block overlap pattern is shown in FIG. 8. In the actual reduction of practice, a 20×20 pixel block was employed with 1 or more pixel steps, depending on the tolerance of the blocking artifacts. Referring to FIG. 7, an image detail signal H, generated as shown in FIG. 4, is processed by a block SVD process 40 (as shown in FIG. 4) to produce a processed image detail signal $H_1'$. Simultaneously, the image detail signal H is delayed by 2 pixels (64) and block SVD processed (40') to produce a processed image detail signal $H_2'$. The 2 pixel delay has the effect of shifting the blocks that are processed by 2 pixels, as shown by the blocks of pixels labeled 66 and 68 in FIG. 8. The image detail signal is similarly delayed by 2 lines (70), and 2 lines plus 2 pixels (72) and block SVD processed (40'') and (40''') to produce processed image detail signals $H_3'$ and $H_4'$ respectively. The 2 line and 2 line plus 2 pixel delays have the effect of shifting the blocks as shown by the blocks of pixels labelled (74) and (76) respectively in FIG. 8. The processed detail signals $H_1'$, $H_2'$, $H_3'$ and $H_4'$ are registered, summed, and averaged (78) to produce the processed image detail signal H'. The processed image detail signal H' is added to the low pass filtered image signal G to produce the processed image signal Z' as shown in FIG. 4. It will be readily apparent that the processing method may be extended to larger blocks with different amounts of block overlap.

Figure 9:
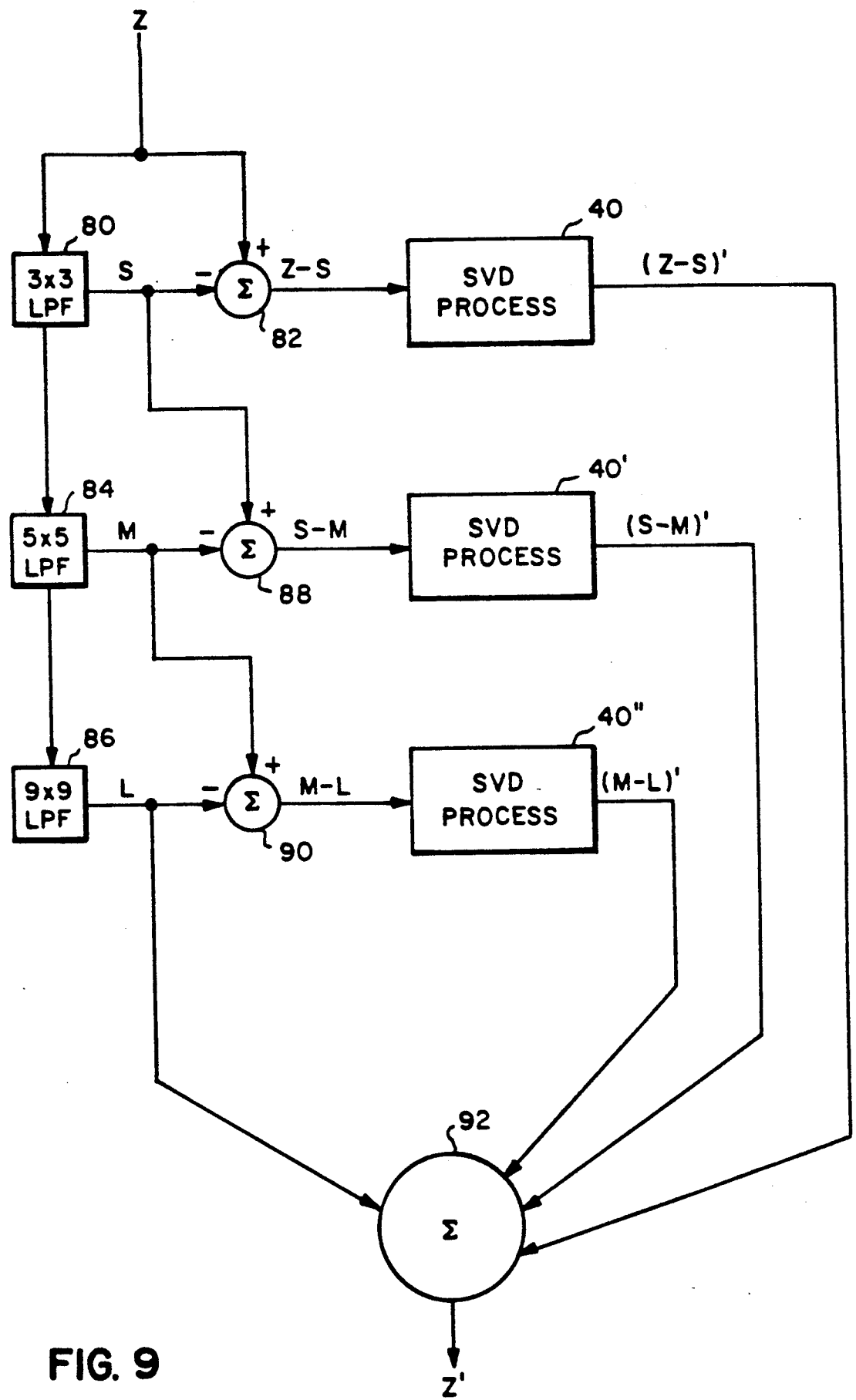
FIG. 9 is a block diagram showing a digital image processing method according to the present invention, having a plurality of stages for processing different spatial frequency pass bands of the image.
Figures 10A, 10B, 10C:
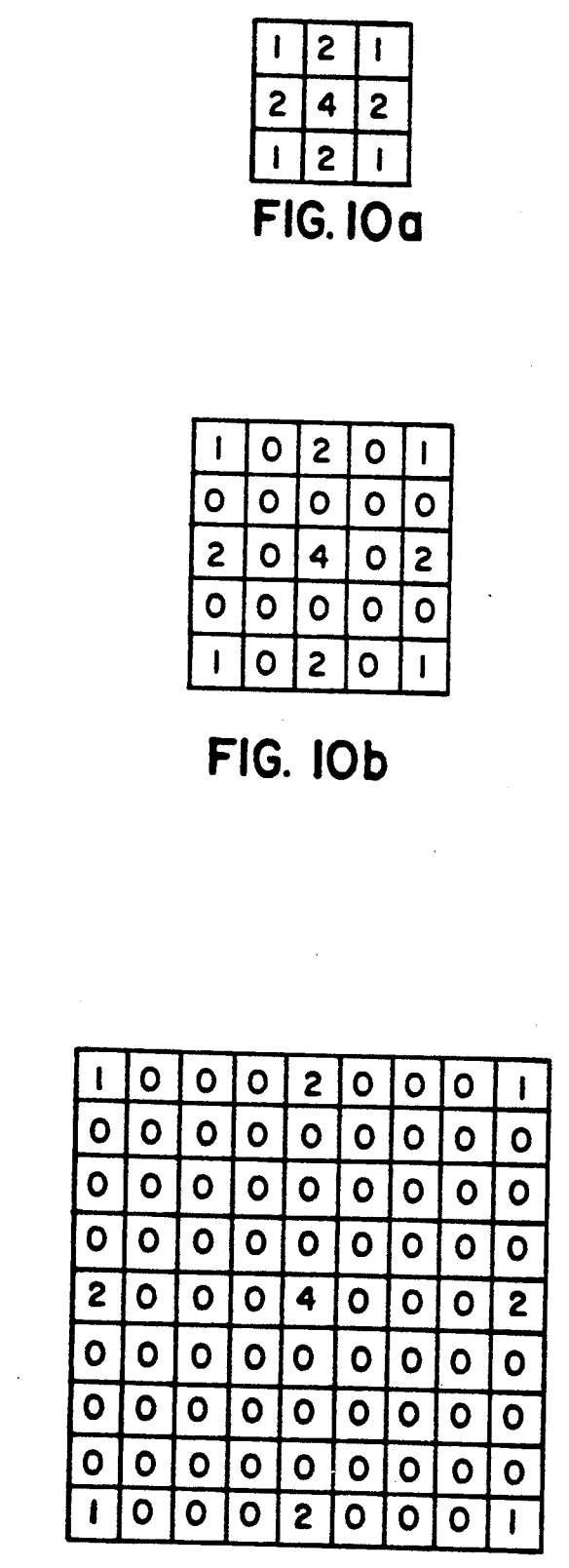

The SVD processing method according to the present invention can be extended to a multi-stage processing method of the type disclosed in U.S. Pat. No. 4,442,454 issued Apr. 10, 1984 to Powell, wherein each stage of the processing employs a detail signal representing a different pass band of spatial frequencies. The processed digital image signal is obtained by combining the processed detail signals from each stage, whereby noise from different spatial frequency content is effectively removed from the image. As shown in FIG. 9, and input digital image Z is filtered through a 3×3 pixel low pass filter 80 to obtain the low pass filtered image S. S is subtracted from Z (82) to obtain the difference image Z-S which is a bandpass filtered version of image Z. Similarly, the low pass filtered image S is filtered through a 5×5 pixel low pass filter 84 to obtain the low pass filtered image M, which is in turn filtered through a 9×9 pixel low pass filter 86 to obtain the low pass filtered image L. M is subtracted from S (88) to form the image difference signal S-M; and L is subtracted from M (90) to form the image difference signal M-L. The difference image signals Z-S, S-M, and M-L are all bandpass versions of the original image Z, with different spatial frequency contents. These bandpass images are processed by the SVD process 40, 40', and 40'' respectively to reduce the noise in the different frequency bands before they are combined (92) with the low pass filtered image L to produce the output image Z'. The filter coefficients used to produce digital filters 80, 84, and 86 are shown in FIG. 10a, b, and c respectively. The 5×5 pixel low pass filter shown in FIG. 10b applied to image S is equivalent to a 7×7 low pass filter applied to Z. The 9×9 pixel low pass filter shown in FIG. 10c, applied to image M is equivalent to a 15×15 low pass filter applied to Z.

The moving average technique can be employed with the multi stage method described with reference to FIG. 9 as follows. Instead of processing the Z-S, S-M, and M-L images through SVD processes 40, each of the bandpass images can be processed through the block overlap SVD processing as described with reference to FIGS 7 and 8. The flow chart of this combined processing is shown in FIG. 11. Referring to FIG. 11, a group of filters and difference amplifiers 94 is employed to generate the bandpass and low pass images Z-S, S-M, M-L, and L from image Z as was described in FIG. 9. A block-overlap SVD process 96, 96', and 96'', as shown in FIG. 7, is applied to bandpass signals Z-S, S-M, and M-L respectively to produce processed bandpass images Z-S', S-M', and M-L'. The processed bandpass images are summed (98) with low pass image L to produce processed image Z'.

Figure 12:
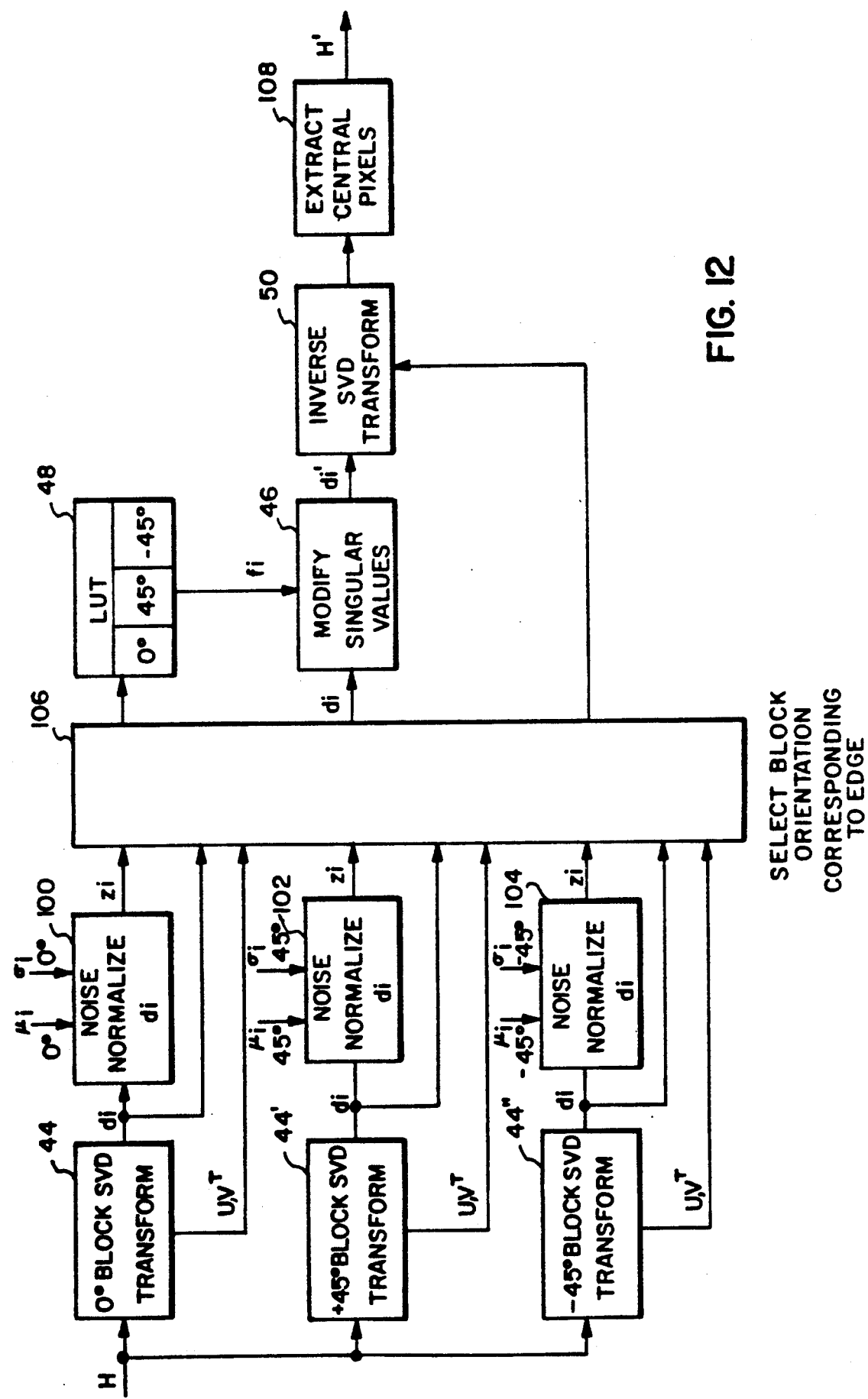
FIG. 12 is a diagram showing a mode of practicing the invention including means for processing diagonal edge information.
Figure 13:
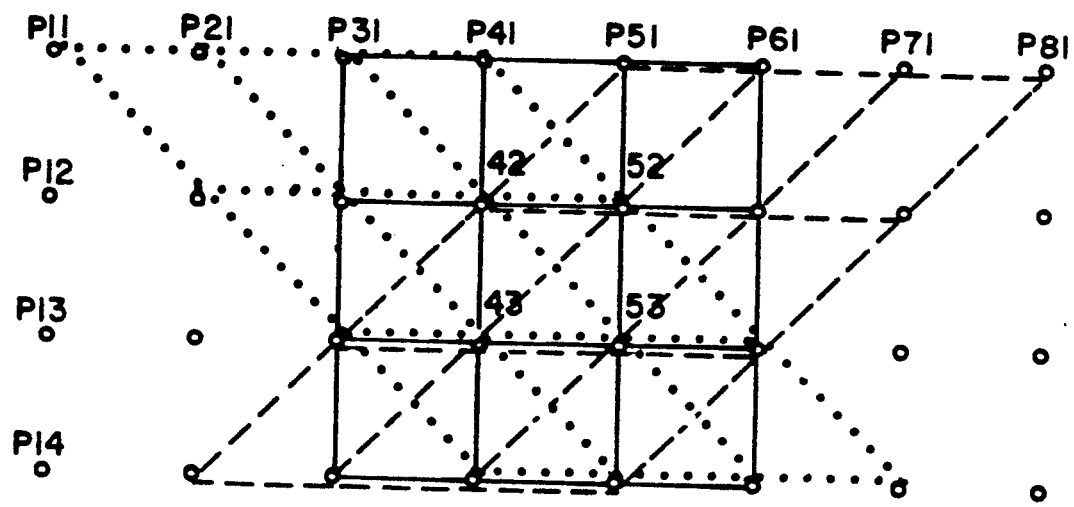
FIG. 13 is a diagram useful in describing the operation of the digital image processing method shown in FIG. 12.

To improve the response to diagonal edges having ±45° orientation, the image blocks are sampled in a trapezoidal pattern as shown in FIG. 13. In this figure we show by example how a 4×4 block of pixels $P_{n,m}$ can be sampled in three different grid orientations, −45 (shown by dotted lines). 0 (shown by solid lines), and +45 degrees (shown by dashed lines). Note that the three differently oriented sampling patterns have a subblock of 4 common pixels ($P_{4,2}P_{5,2}P_{4,3}$ and $P_{5,3}$) in the center. As shown FIG. 12, the SVD transform is performed on each of the three blocks of different orientations. The image detail signal H, generated as shown in FIG. 4, is processed by a 0° block SVD transform 44, a +45° block SVD transform 44', and a −45° block SVD transform 44'', to produce sets of singular vector matrices U and $V^T$ and singular values $d_i$. The singular values $d_i$ are noise normalized (100, 102, 104) according to:

$$z_i = (d_i - \mu_i)/\sigma_i \quad (5)$$

where i=1, 2, ... n; and $\mu_i$ and $\sigma_1$, are the mean and standard deviations, respectively, of the noise singular values $d_i$ generated for each block orientation (0°, 45°, and 45°) as described previously with reference to FIG. 5. The block orientation most closely corresponding to the orientation of an edge is selected (106) on the basis of the values of the noise normalized singular value $z_i$. Generally, if the orientation of the SVD blocks transform corresponds to the orientation of an edge in the image, its noise normalized singular values $z_i$ decrease faster as the index i increases, and the first few values $z_1$ and $z_2$ are higher than those of blocks not oriented with an edge. The selection is performed as follows. Starting from i=1, $z_i$ from each block is compared with the noise level say $3.5\sigma_i$ for the block orientation. The lowest index i where the normalized singular value falls within the noise level is noted and denoted $i_n$. If $i_n$ for all 3 block orientations (i.e. 0°, 45°, and −45°) are different, the block orientation with the lowest $i_n$ is selected. If the lowest $i_n$ is the same for two orientations, then the orientation with the largest value of $(z_1+z_2)$ is selected. If $i_n$ is identical for all three orientations and $i_n$ is 1, then the region is most likely dominated by noise and the 0° orientation is selected. If $i_n$ is the same for all three orientations and $i_n$ is equal to 2 then the orientation with the largest value of $z_1$ is selected. If $i_n$ is the same for all three orientations and $i_n$ is greater than 2, then an orientation with the largest $(z_1+z_2)$ is selected. An orientation chosen in this way provides the best representation of the local image detail. A look up table 48 of factors $f_i$ for modifying the singular values is prepared as was described with reference to FIG. 5 for each block orientation. The appropriate factors $f_i$ are applied (46) to the singular values $d_i$ from the block having the selected orientation to produce modified singular values $d_i'$. The modified singular values $d_i'$ and singular vector matrices U and $V^T$ are inverse transformed (50) to produce a noise reduced image detail signal. The 4 pixels ($P_{4,2}P_{5,2}P_{4,3}$ and $P_{5,3}$) common to all three block orientations are extracted from each processed block to produce the noise reduced image detail signal H'. Finally, the noise reduced image detail signal H' is added back to the low pass image signal G to form the processed image signal Z' as shown in FIG. 4. Although the diagonal block SVD processing method was described with reference to 4×4 block of pixels for ease of description, the presently preferred block size is 20×20 pixels, having a region of 10×10 pixels common to all three blocks orientations.

The diagonal block SVD processing method is preferably implemented using the multistage block overlap technique described with reference to FIG. 11, and the center common block portion of 4 pixels is extracted from the SVD processed block of that orientation.

The method of the present invention can be applied to processing digital color images in a variety of ways. In one mode, the digital color image is separated into red, green, and blue color separation images, and each color separation image is processed using a block SVD transform method as described above. In the preferred mode of practicing the invention with a color image, the red, green, and blue color image is transformed into a luminance Y (e.g. Y=⅜R+4/8 G+⅛B) and two color difference components (R-Y and B-Y). Each of these images is processed using any one of the SVD block transform methods described above to produce processed luminance and color difference signals. The processed luminance and color difference signals are recombined to produce the processed color image In an alternative method, the red, green, blue color images are transformed into a luminance (Y), and two color difference components (R-Y and B-Y). Only the luminance image Y is processed using the block SVD transform method and the processed luminance image is recombined with the color difference components to produce a processed color image This approach reduces the processing time compared with the method discussed immediately above.

Industrial Applicability and Advantages

The image processing method according to the present invention is useful in graphic arts digital image processing and photographic digital image processing. The method has the advantages of producing a processed image having reduced noise and free from undesirable artifacts in areas of texture. The method has the further advantage that image detail is not degraded by the image processing.

```
                       APPENDIX A
                       Copyright 1988
                       Eastman Kodak Company
      c        filter.for
      c        generate filter(mask) file c        oct-26-87
      c        link with svd_util.for character*32 text,fname,fname2
               dimension table(0:999)

data ir,iw/5,6/
               data iu,iu2/99,98/ write(iw,10)
      10       format(/,' filter: generates filter file',/)

c        input text='filter file'
               call ascnam(ir,iw,text,fname)
               call blksiz(ir,iw,nbe,nbl)
               call smplxy(ir,iw,ixsmpl,iysmpl)

write(iw,32)
      32       format(' mode options:'
              1,/,14x,'0:gauss'
              2,/,14x,'1:exp'
              3,/,14x,'2:uniform'
              4,/,14x,'3:user input'
              5,/,14x,'4:input from disk, ascii file'
              1,/,' mode, sigma_x,sigma_y')
               read(ir,*) mode,sigmax,sigmay
      34       format(i,2f)

c        user input mask if(mode.eq.3) then
               write(iw,112)
      112      format(' type line by line: max 10x10 by hand input')
               do 801 j=0,nbl-1
               write(iw,114) j
      114      format(1x,i5,' th line ?')
               read(ir,*) (table(j*nbe+i),i=0,nbe-1)
      116      format(10f)
      801      continue
      c        enddo    loop j else if(mode.eq.4) then
               call clrasc(32,text)
               text='user input disk file'
               call ascnam(ir,iw,text,fname2)
               open(unit=iu2,file=fname2,status='old')
               read(iu,*) nbe,nbl,ixsmpl,iysmpl
      216      format(4i)
               do 802 j=0,nbl-1
               read(iu,*) (table(j*nbe+i),i=0,nbe-1)
      218      format(10f)
      802      continue
      c        enddo    loop j
```

```
          else if(mode.eq.0.or.mode.eq.1.or.mode.eq.2) then xc=(nbe-1)/2.
          yc=(nbl-1)/2.

do 803 iy=0,nbl-1
          do 804 ix=0,nbe-1
           x=float(ix)-xc
           y=float(iy)-yc c         gaussian,exponential,and uniform masks if(mode.eq.0) then
          table(iy*nbe+ix)=gauss(x,sigmax)*gauss(y,sigmay)
          else if(mode.eq.1) then
          table(iy*nbe+ix)=exp(-abs(x)/sigmax)*exp(-abs(y)/sigmay)
          else if(mode.eq.2) then
          table(iy*nbe+ix)=1.
          endif
c         mode 804       continue
c         enddo   loop ix
803       continue
c         enddo   loop iy endif
c         mode c         output
          open (unit=iu,file=fname,status='new')

write(iu,102) nbe,nbl,ixsmpl,iysmpl,sigmax,sigmay
102       format(1x,4i5,2e15.5)
          do 805 i=0,nbe*nbl-1
          write(iu,104) i,table(i)
104       format(1x,i5,e15.5)
805       continue
c         enddo close(iu)

end function gauss(x,sigma)

data pi/3.1415926535/ if(sigma.eq.0.) then
                  if(x.eq.0.) then
                  gauss=1.
                  else if(x.ne.0.) then
                  gauss=0.
                  endif
          else if(sigma.ne.0.) then
                  arg=(x**2)/(2.*(sigma**2))
                  gauss=exp(-arg)/(sqrt(2.*pi)*sigma)
          endif return
          end
```

APPENDIX B
Copyright 1988
Eastman Kodak Company

```fortran
c       convol.for
c       convolution of an image with a mask(filter)

c       oct-26-87
c       link with svd_util.for c       assumes picture is one layer character*1 com
        character*32 fname1,fmask,fname3
        character*32 text dimension bufi(0:99999)
        dimension bufo(0:1999)
        dimension work1(0:2100),work2(0:2100)
        dimension lp(0:59)
        dimension wt(0:899)

data ir,iw/5,6/
        data iu1,iu2,iu3/51,52,53/ c       ne: number of pixels per line (max:2000 pixels)
c       nl: number of lines of the image
c       nbe: # of elements per block   (block size in x)
c       nbl: # of lines per block (block size in y)

write(iw,10)
10      format(/,' convol: makes a convolution of an image',/)

call picsiz(ir,iw,'i',nc,ne,nl)
        call recsiz(ir,iw,ne,lform,lrec)
        call winsiz(ir,iw,ne,nl,ixl,ixh,iyl,iyh)
        call picnam(ir,iw,1,'i',fname1)
        call picopn(iu1,fname1,lrec,'old',' ')
c       input file seqeuntial text='convolution mask file' call ascopn(iu2,fmask,'old',' ')
c       readonly call picnam(ir,iw,1,'o',fname3)
        call picopn(iu3,fname3,lrec,'new',' ')

write(iw,52)
52      format(' normalization by sum of masks (y:d/n) ?')
        read(ir,54) com
54      format(a1)

read(iu2,*) nbe,nbl,ixsmpl,iysmpl,dum,dum
114     format(1x,4i5,2e15.5)
        do 801 j=0,nbl-1
             do 802 i=0,nbe-1
             k=j*nbe+i
             read(iu2,116) iorder,wt(k)
             write(iw,118) iorder,wt(k)
116     format(1x,i5,e15.5)
118     format(1x,i5,'th weight = ',e15.5)
802     continue
c       enddo    loop i
801     continue
c       enddo            loop j close(iu2)

sum=0.
```

```
             do 803 k=0,nbe*nbl-1
             sum=sum+wt(k)
803          continue
c            enddo    loop k nbec=(nbe-1)*ixsmpl/2
c                       !center of nbe
             nblc=(nbl-1)*iysmpl/2
c                       !center of nbl
             msizx=ixsmpl*(nbe-1)+1
             msizy=iysmpl*(nbl-1)+1
             nbsizx=ixsmpl*nbe
             nbsizy=iysmpl*nbl write(iw,202) ix0,iy0,ixsmpl,iysmpl
         1,msizx,msizy,nbsizx,nbsizy
202          format(' main: ix0,iy0 = ',2i8
         1,/,' main: ixsmpl,iysmpl = ',2i8
         1,/,' main: support size = ',2i8
         1,/,' main: nbe*ixsmpl,nbl*iysmpl = ',2i8)

write(iw,*) 'ok ' c            let's take care of the border area here do 810 iy=1,jy0+nblc
c            do not bother to do (jy0+nblc-1) lines
             irec=iy
             read(iu1,rec=irec) (bufi(i),i=0,ne-1)
             write(iu3,rec=irec) (bufi(i),i=0,ne-1)
c            same one back
810          continue
c            enddo   loop iy lextra=0
             do 811 iys=0,iysmpl-1
             jy0=iy0+iys
             nytry=(nl-jy0-(nbl-1)*iysmpl)/iysmpl
c            number of loops in y direction ll=nl-nytry*iysmpl-jy0-nblc
c                     remaining extra lines
             if(ll.gt.lextra) lextra=ll
811          continue
c            enddo   loop iys c            write out remaining lines if(lextra.gt.0) then
                   line3=nl-lextra+1 c            starting line for lextra
                   do 812 iy=0,lextra-1
                   irec=line3+iy
                   read(iu1,rec=irec) (bufi(i),i=0,ne-1)
                   write(iu3,rec=irec) (bufi(i),i=0,ne-1)
812          continue
c                  enddo    loop iy
             endif
c            lextra c            ok now run the engine do 820 iys=0,iysmpl-1
             jy0=iy0+iys
             jx0=ix0
             mseq=iys call engine(ir,iw,iu1,iu3,ne,nl,nbe,nbl,ixsmpl,iysmpl
         1,bufi,bufo,lp,work1,work2
         2,jx0,jy0,mseq,wt,nbsizx,nbsizy,nbec,nblc,lrec)
```

```
820         continue
c           enddo   loop iys c           normalize by the sum of weights if(com.eq.'n'.or.com.eq.'N') then
            write(iw,*) ' as you chose, the normalization was not done. '
            else
            denom=sum
            call dskdiv(iu3,iu3,lrec,bufi,ne,nl,denom)
            endif
c           !com close(iu1)
            close(iu3)

end c------------------------------------------------------------------ subroutine engine(ir,iw,iu1,iu3,ne,nl,nbe,nbl,ixsmpl,iysmpl
       1,bufi,bufo,lp,work1,work2
       2,jx0,jy0,mseq,wt,nbsizx,nbsizy,nbec,nblc,lrec)

dimension bufi(0:ne*nbl-1)
c           for nbl lines
            dimension bufo(0:ne-1)
c                   output buffer
            dimension lp(0:nbl-1)
            dimension work1(0:ne+nbe-2)
            dimension work2(0:ne-1)
            dimension wt(0:nbe*nbl-1)

if(mseq.eq.0) then
            write(iw,802) nbe,nbl,ixsmpl,iysmpl
802         format(' engine: nbe,nbl,ixsmpl,iysmpl=',4i5)
            write(iw,804)
804         format(' weights:')
            do 901 k=0,nbe*nbl-1
            write(iw,806) k,wt(k)
806         format(1x,i5,e15.5)
901         continue
c           enddo   loop k endif nytry=(nl-jy0-(nbl-1)*iysmpl)/iysmpl
c           number of loops in y direction write(iw,800) jx0,jy0,nytry
800         format(/,' engine: jx0,jy0,nytry:',3i5)

call ptr0(nbl,lp)
c           initialize pointer lp(k)

c           initially read in nbl lines
            do 910 j=0,nbl-1
            linei=jy0+j*iysmpl+1
c                   irec starts from 1
            read(iu1,rec=linei) (bufi(ne*lp(j)+i),i=0,ne-1)
910         continue
c           enddo   loop j line1=jy0+(nbl-1)*iysmpl+1
c                   offset for input  line
            line11=jy0+nblc+1
c           offset for output line do 911 iy=0,nytry-1 linei=line1+iy*iysmpl
```

```
c           !iysmpl
            if(iy.ne.0) then
            read(iu1,rec=linei) (bufi(ne*lp(nbl-1)+i),i=0,ne-1)
c                       always read into lp(nbl-1)
            endif
c           iy do 912 ixs=0,ixsmpl-1
            ixoff=jx0+ixs
            nxtry=(ne-jx0-ixs)/ixsmpl
c           number of data in x c-------beginning of convolution calculation call clr(nxtry+nbe-1,work1)
c           clear working area
            call clr(nxtry,work2)
c           temporaty place to hold sampled result nbec=(nbe-1)/2
            do 913 j=0,nbl-1
            call movxs(nxtry,ixsmpl,bufi(ne*lp(j)+ixoff),work1(nbec))

c           get data into the working area with offset nbec
                do 914 i=0,nbe-1
                k=j*nbe+i
                wtij=wt(k)
                call mulcy(nxtry,wtij,work1(i),work2)

c                       accumulate result in work2
914         continue
c               enddo   loop i call movxsi(nxtry,ixsmpl,work2,bufo(ixoff))
c               get sampled output from the copvolution result 913         continue
c           enddo   loop j c-------end of convolution calculation 912         continue
c           enddo   loop ixs lineo=line11+iy*iysmpl
            write(iu3,rec=lineo) (bufo(i),i=0,ne-1)

call ptr(nbl,lp)
c           update pointer 911         continue
c           enddo   loop iy return
            end APPENDIX C.                    Copyright 1988, Eastman Kodak Company
c       .imgn.for
c       arithmatic operations:(add/subtract,multiply,and divide)
c       in n image layers c       sep-2-87
c       link with iputil.for c       assumes picture is a one layer image.

character*1 com
        character*32 fname(0:9)

dimension buf(0:3999,0:9)
```

```
          dimension iu(0:9)
          dimension f(0:9)

data ir,iw/5,6/
          data iu0/50/
c         starting unit number c         ne: number of pixels per line
c         nl: number of lines of the image
c         n:  number of input files write(iw,10)
10        format(/,' imgn: arithmatic in n image layers',/)
          call picsiz(ir,iw,'i',nc,ne,nl)
          call recsiz(ir,iw,ne,lform,lrec)
          call winsiz(ir,iw,ne,nl,ixl,ixh,iyl,iyh)

write(iw,22)
22        format(' how many images as an input (max=9) ?')
          read(ir,*) n
24        format(i)

do 801 ifile=0,n
          iu(ifile)=iu0+ifile
801       continue
c         assign unit number call picnam(ir,iw,n,'i',fname(1))

c         read n input file names starting fname(1)

do 803 ifile=1,n
          call picopn(iu(ifile),fname(ifile),lrec,'old',' ')
803       continue
c         enddo   loop ifile call picnam(ir,iw,1,'o',fname(0))
c         output file call picopn(iu(0),fname(0),lrec,'new',' ')

write(iw,52)
52        format(' a(add),m(mul),d(div) ?')
          read(ir,54) com
54        format(a1)

do 804 i=1,n
          write(iw,56) i
56        format(1x,i5,' th factor (real) ?')
          read(ir,*) f(i)
58        format(f)
804       continue
c         enddo   loop i 60        write(iw,62)
62        format(' overall normalization factor (real) ?')
          read(ir,*) f(0)
64        format(f)
          if(f(0).eq.0.) go to 60 call engine(ir,iw,iu,lrec,fname
         1,ne,nl,ixl,ixh,ihl,iyh,buf,n,f,com)

do 821 ifile=0,n
          close(iu(ifile))
821       continue
c         enddo   !loop ifile end c----------------------------------------------------------------
```

```fortran
      subroutine engine(ir,iw,iu,lrec,fname
     1,ne,nl,ixl,ixh,ihl,iyh,buf,n,f,com)

character*1 com
      character*32 fname(0:n)
      dimension buf(0:ne-1,0:n),iu(0:n),f(0:n)

write(iw,12) com,n
12    format(' engine: com,n =',a1,i5)

do 801 i=1,n
      write(iw,14) f(i)
14    format(9x,'f(i) = ',t35,e15.5)
801   continue
c     enddo    loop i write(iw,16) f(0)
16    format(/,9x,'overall normalization =',e15.5)
      write(iw,705) ixl,ixh,iyl,iyh
705   format(' ixl,ixh,iyl,iyh = ',4i5)

do 802 iy=iyl+1,iyh+1
c     since irec starts from 1 do 803 ifile=1,n
      read(iu(ifile),rec=iy) (buf(i,ifile),i=0,ne-1)
803   continue
c     enddo    loop ifile do 804 ix=ixl,ixh
      buf(ix,0)=f(1)*buf(ix,1)
804   continue
c     enddo    !loop ix do 805 ifile=2,n
      if(com.eq.'a'.or.com.eq.'A') then
              do 811 ix=ixl,ixh
              buf(ix,0)=buf(ix,0)+f(ifile)*buf(ix,ifile)
811           continue
c             enddo    loop ix
      else if(com.eq.'m'.or.com.eq.'M') then
              do 812 ix=ixl,ixh
              buf(ix,0)=buf(ix,0)*f(ifile)*buf(ix,ifile)
812           continue
c             enddo    loop ix
      else if(com.eq.'d'.or.com.eq.'D') then
              do 813 ix=ixl,ixh
              if(f(ifile)*buf(ix,ifile).ne.0.) then
              buf(ix,0)=buf(ix,0)/(f(ifile)*buf(ix,ifile))
              endif
c             divide by zero ?
813           continue
c             enddo    loop ix
      endif
c     com
805   continue
c     enddo    !loop ifile do 806 ix=ixl,ixh
      buf(ix,0)=buf(ix,0)/f(0)
806   continue
c     enddo    loop ix write(iu(0),rec=iy) (buf(ix,0),ix=0,ne-1)
```

```
802         continue
c           enddo        loop iy return
            end
``` liang@liang filter.for

Tue Oct 27 17:35:22 1987 lw / Sun LaserWriter

```
Sun LaserWriter  liang:liang  Job: filter.for  Date: Tue Oct 27 17:35:22 1987
c           'filter.for
c           generate filter(mask) file c           oct-26-87
c           link with svd_util.for character*32 text,fname,fname2
            dimension table(0:999)

data ir,iw/5,6/
            data iu,iu2/99,98/ write(iw,10)
10          format(/,' filter: generates filter file',/)

c           input text='filter file'
            call ascnam(ir,iw,text,fname)
            call blksiz(ir,iw,nbe,nbl)
            call smplxy(ir,iw,ixsmpl,iysmpl)

write(iw,32)
32          format(' mode options:'
     1  ,/,14x,'0:gauss'
     2  ,/,14x,'1:exp'
     3  ,/,14x,'2:uniform'
     4  ,/,14x,'3:user input'
     5  ,/,14x,'4:input from disk, ascii file'
     1  ,/,' mode, sigma_x,sigma_y')
            read(ir,*) mode,sigmax,sigmay
34          format(i,2f)

c           user input mask if(mode.eq.3) then
            write(iw,112)
112         format(' type line by line: max 10x10 by hand input')
            do 801 j=0,nbl-1
            write(iw,114) j
114         format(1x,i5,' th line ?')
            read(ir,*) (table(j*nbe+i),i=0,nbe-1)
116         format(10f)
```

```
801     continue
c       enddo   loop j else if(mode.eq.4) then
        call clrasc(32,text)
        text='user input disk file'
        call ascnam(ir,iw,text,fname2)
        open(unit=iu2,file=fname2,status='old')
        read(iu,*) nbe,nbl,ixsmpl,iysmpl
216     format(4i)
        do 802 j=0,nbl-1
        read(iu,*) (table(j*nbe+i),i=0,nbe-1)
218     format(10f)
802     continue
c       enddo   loop j else if(mode.eq.0.or.mode.eq.1.or.mode.eq.2) then xc=(nbe-1)/2.
        yc=(nbl-1)/2.

do 803 iy=0,nbl-1
        do 804 ix=0,nbe-1
        x=float(ix)-xc
        y=float(iy)-yc c       gaussian,exponential,and uniform masks if(mode.eq.0) then
        table(iy*nbe+ix)=gauss(x,sigmax)*gauss(y,sigmay)
        else if(mode.eq.1) then
        table(iy*nbe+ix)=exp(-abs(x)/sigmax)*exp(-abs(y)/sigmay)
        else if(mode.eq.2) then
        table(iy*nbe+ix)=1.
        endif
c       mode 804     continue
c       enddo   loop ix
803     continue
c       enddo   loop iy endif
c       mode c       output
        open (unit=iu,file=fname,status='new')

write(iu,102) nbe,nbl,ixsmpl,iysmpl,sigmax,sigmay
102     format(1x,4i5,2e15.5)
        do 805 i=0,nbe*nbl-1
        write(iu,104) i,table(i)
104     format(1x,i5,e15.5)
805     continue
c       enddo close(iu)

end
        function gauss(x,sigma)

data pi/3.1415926535/ if(sigma.eq.0.) then
            if(x.eq.0.) then
            gauss=1.
            else if(x.ne.0.) then
            gauss=0.
            endif
```

```
      else if(sigma.ne.0.) then
           arg=(x**2)/(2.*(sigma**2))
           gauss=exp(-arg)/(sqrt(2.*pi)*sigma)
      endif return
      end
```

APPENDIX D
Copyright 1988
Eastman Kodak Company

```
c      svdnoi.for
c      calculate svd distribution for a noise patch c      oct-26-87
c      link with svd_util.for c      this program includes the mode options c      get a random block starting (ix0,iy0)
c      input band-pass noise patch (random file)
c      output : block size,ixsmpl,iysmpl
c              order,mean svd,sigma svd,ratio c      block size up to 40x40 character*32 text,fname1,fname2 dimension  buf(0:1999,0:39)
       dimension  a(0:39,0:39),u(0:39,0:39),v(0:39,0:39)

data ir,iw/5,6/
       data iu1,iu2/51,52/ c      nbe: # of elements per block   (block size)
c      ne: number of pixels per linbe (e.g. 400 pixels, or 1136 pixels)
c      nl: number of linbes of the image write(iw,10)
10     format(/' svdnoi: calculate svd distribution for a noise patch'/)

call picsiz(ir,iw,'i',nc,ne,nl)
       call recsiz(ir,iw,ne,lform,lrec)
       call picnam(ir,iw,1,'i',fname1)
       call picopn(iu1,fname1,lrec,'old',' ')

call blksiz(ir,iw,nbe,nbl)
       call smplxy(ir,iw,ixsmpl,iysmpl)
       nbsize=nbe*ixsmpl text='output mean svd file'
       call ascnam(ir,iw,text,fname2)
       call ascopn(iu2,fname2,'new',' ')

write (iw,122)
122    format(' mode'
     1,/,t25,'0: 0    degree or 90 degree'
     2,/,t25,'1: 45   degree'
     3,/,t25,'2: 135  degree')
       write(iw,110)
110    format(' mode ?')
       read(ir,*) mode
111    format(i)

write(iw,140)
140    format(' ix0,iy0,nxtry,nytry ?')
       read(ir,*) ix0,iy0,nxtry,nytry
142    format(4i)

call hui(ir,iw,iu1,lrec,buf,nc,ne,nl,a,u,v
     1,nbe,ixsmpl,iysmpl,nbsize,ix0,iy0,nxtry,nytry,mode
     2,iu2,fname1,fname2)
       close(iu1)
       close(iu2)

end
```

```
c------------------------------------------------------------------------
      subroutine hui(ir,iw,iul,lrec,buf,nc,ne,nl,a,u,v
     1,nbe,ixsmpl,iysmpl,nbsize,ix0,iy0,nxtry,nytry,mode
     2,iu2,fname1,fname2)

c     this subroutinbe does all the actual processing.
c     main program just sets up array sizes for a given picture.

character*32 fname1,fname2 dimension  buf(0:ne-1,0:nbe-1)
      dimension  a(0:nbe-1,0:nbe-1)
      dimension  u(0:nbe-1,0:nbe-1),v(0:nbe-1,0:nbe-1)

dimension  work(100)
      dimension  sigma(0:39),id(0:39)
      dimension  fmean(0:39),fsigma(0:39),ratio(0:39)

dimension  fsum1(0:39),fsum2(0:39)

c     parameters for svd subroutinbe
      n=nbe
      m=nbe
      nm=nbe ftot=nxtry*nytry
      ftot=ftot*ixsmpl*iysmpl call clrx(nbe+1,fmean)

c     last of nbe for sum of singular values
      call clrx(nbe+1,fsigma)
      call clrx(nbe+1,fsum1)
      call clrx(nbe+1,fsum2)

write(iw,800) mode,ix0,iy0,nxtry,nytry
     1,nbe,ixsmpl,iysmpl,nbsize
800   format(' hui: mode,ix0,iy0,nxtry,nytry = ',5i5,/
     1,6x,'nbe,ixsmpl,iysmpl,nbsize = ',4i5)

ln=iy0 c     skip (iy0-1) lines do 901 iy=0,nytry-1
c     number of loops in y direction
      line1=iy0+iy*nbsize+1 do 902 iys=0,iysmpl-1
      line2=line1+iys do 903 j=0,nbe-1
c     read nbe linbes
          irec=line2+j*iysmpl
          read(iul,rec=irec) (buf(i,j),i=0,ne-1)
c     just read ne elements
903       continue
c              enddo          loop nbe do 904 ix=0,nxtry-1
c              number of loops in x direction ixoff1=ix0+nbsize*ix
      if(mode.eq.1) then
           ixoff1=ixoff1+nbsize/2
      else if(mode.eq.2) then
           ixoff1=ixoff1-nbsize/2
      endif
```

```
              do 905 ixs=0,ixsmpl-1
        ixoff2=ixoff1+ixs do 906 j=0,nbe-1
c     get a block into a(k,j)
              do 907 k=0,nbe-1
              kk=ixoff2+k*ixsmpl
              if(mode.eq.0)then
              a(k,j)=buf(kk,j)
c     straight
              else if(mode.eq.1)then
              a(k,j)=buf(kk-j,j)
c     45 degree slant
              else if(mode.eq.2)then
              a(k,j)=buf(kk+j,j)
c     135 degree slant
              endif
c     mode?
907     continue
906     continue
c              end of loop j
c              end of loop k call svd(nm,m,n,a,sigma,.false.,u,.false.,v,ierr,work)
c     no need to calculate U and V matrix. so the input is .false.

if(ierr.ne.0) write(iw,20) ierr,line2,ixoff2
20      format(' trouble. ierr= ',i4,' at line2,ixoff2 = ',2i5)

call sort(nbe,sigma,id)
c     sort in descending order c     sigma(i,l(id)): ith singular value toteig=0.
c     sum of eigen values
              do 911 l=1,nbe-1
              toteig=toteig+sigma(l)
911     continue
c              end of loop l do 912 l=0,nbe
              if(l.eq.nbe) then
              fsum1(l)=fsum1(l)+toteig
              fsum2(l)=fsum2(l)+toteig**2
              else
              fsum1(l)=fsum1(l)+sigma(l)
              fsum2(l)=fsum2(l)+sigma(l)**2
              endif
912     continue
c       end of loop l 905     continue
c       end of loop ixs
904     continue
c       end of loop ix 902     continue
c       end of loop iys
901     continue
c       end of loop iy
c       ok now calculate statistics write(iw,100)
100     format(3x,l,10x,'fmean',10x,'fsigma')

do 913 l=0,nbe
              fmean(l)=fsum1(l)/ftot
              fsigma(l)=fsum2(l)/ftot-fmean(l)**2
              if(fsigma(l).lt.0.) then
```

```
              write(5,105) l,fmean(l),fsigma(l)
              fsigma(l)=0.
              endif
105           format(' l,fmean(l),fsigma(l) = ',i5,2e15.5)

fsigma(l)=sqrt(fsigma(l))

if(fsigma(l).eq.0.) then
              ratio(l)=0.
              else
              ratio(l)=fmean(l)/fsigma(l)
              endif
c             fsigma(l) ?

913           continue
c             end of loop l write(iu2,108) nbe,ixsmpl,iysmpl
108           format(1x,3i10)

do 921 l=0,nbe
c             write final result
              if(l.eq.nbe) then
              write(iw,110) fmean(l),fsigma(l),ratio(l)
              write(iu2,110) fmean(l),fsigma(l),ratio(l)
110           format(//,6x,3e15.5)
              else
              write(iw,120) l,fmean(l),fsigma(l),ratio(l)
              write(iu2,120) l,fmean(l),fsigma(l),ratio(l)
120           format(1x,i5,3e15.5)
              endif
921           continue
c             enddo write(iu2,130) fname2,fname1
130           format(/' svd noise file name = ',a32
     1        ,/,' from data file: ',a32)

write(iu2,140) nc,ne,nl
140           format(//,' input parameters were: nc,ne,nl = ',3i5)
              write(iu2,150) nbe,ixsmpl,iysmpl,mode,ix0,iy0,nxtry,nytry
150           format(' nbe,ixsmpl,iysmpl = ',3i5
     1        ,/,' mode,ix0,iy0,nxtry,nytry = ',5i5)

return
              end
c       GRAIN SUPPRESSION BY SINGULAR VALUE DECOMPOSITION

C       SVD_BASIC.FOR  -- BASIC VERSION

C           link with svd_util.for

C       oct-26-87

C       maximum svd block size : 40x40 dimension   BUFI(0:1999,0:39)
        dimension   BUFO(0:1999,0:39)
        dimension   A(0:39,0:39),U(0:39,0:39),V(0:39,0:39)
        dimension   WT(0:39)
        dimension   FC(0:39),DFC(0:39),RATIO(0:39)

data IR,IW/5,6/ data iui,iuo,iun/51,52,53/
        data iuw/61/
        data a,u,v/1600*0.,1600*0.,1600*0./
        data wt/40*0./
        data fc,dfc,ratio/40*0.,40*0.,40*0./
```

```
C     NBE: # of elements per block   (BLOCK SIZE)
C     NE: number of pixels per line (e.g. 500 pixels)
C     NL: number of lines of the image
c     ixsmpl,iysmpl : sampling in x and y directions

C     INPUT c     define image size : nc,ne,nl
      call picsiz (ir,iw,'I',nc,ne,nl)

c     define image record size
      call recsiz (ir,iw,ne,lform,lrec)

c     open input image file
      call ifile (ir,iw,iui,lform,lrec)

c     read noise data file
      call nfile (ir,iw,iun,nbe,ixsmpl,iysmpl,fc,dfc,ratio)

c     open output image file
      call ofile (ir,iw,iuo,lform,lrec)

c     get pre/post processing weights
      call wfile (ir,iw,iuw,modew,nbe,wt,sum )

write (iw,122)
122   format (' Starting pixel position: IX0,IY0 ?')
      read (ir,*) ix0,iy0 c     block orientation mode = 0 (0 or 90 degree)

modeb=0 write (iw,151)
151   format (' Threshold formula'
     1,/,' 0: HARD CLIP: (THRESHOLD1,THRESHOLD2)'
     2,/,' 5: THRESHOLD1, NOISE = -(Ni/Si)**POWER AND THRESHOLD2'
     3,/,' 6: THRESHOLD1 ,EXP(-A*X**4) AND THRESHOLD2')

write (iw,152)
152   format (' Threshold formula(I) ?')
      read (ir,*) iform
```

APPENDIX E
Copyright 1988
Eastman Kodak Company

```
      write (iw,162)
162   format (' THRSH1(R),POWER(R),THRSH2,COEFF(FOR 6:) ?')
      read (ir,*) thrsh1,power,thrsh2,coeff msize = ixsmpl*(nbe-1)+1
      nbsize = ixsmpl*nbe write (iw,202) nbe,ix0,iy0,ixsmpl,iysmpl,msize,nbsize
202   format (' MAIN: NBE,IX0,IY0 = ',T30,3I8
     1,/,' MAIN: IXSMPL,IYSMPL = ',T30,2I8
     2,/,' MAIN: SUPPORT SIZE = ',T30,I8
     3,/,' MAIN: NBE*IXSMPL = ',T30,I8 )
204   format (' MODEW, SUM OF WEIGHTS = ',I5,E15.5)

if (modew.ne.0) then
         write (iw,204) modew,sum
      endif jy0 = iy0
            jx0 = ix0
```

```
          call hui (ir,iw,iui,iuo,nc,ne,nl,nbe,ixsmpl,iysmpl
     1              ,bufi,bufo,a,u,v,fc,dfc,ratio
     2              ,iform,thrsh1,coeff,power,thrsh2
     3              ,jx0,jy0,modew,wt,lrec)

if (modew.eq.1.or.modew.eq.2) then
          denom = (sum*sum)/(nbe*nbe)
          call dskdiv (iuo,iuo,lrec,bufo,ne,nl,denom)
       endif
c      close (iui)
c      close (iuo)

end c----------------------------------------------------------------------
       subroutine hui(ir,iw,iui,iuo,nc,ne,nl,nbe,ixsmpl,iysmpl
     1              ,bufi,bufo,a,u,v,fc,dfc,ratio
     2              ,iform,thrsh1,coeff,power,thrsh2
     3              ,jx0,jy0,modew,wt,lrec)

C     THIS SUBROUTINE DOES ALL THE ACTUAL PROCESSING.
C     MAIN PROGRAM JUST SETS UP ARRAY SIZES FOR A GIVEN PICTURE.

dimension  bufi(0:ne-1,0:nbe-1)
       dimension  bufo(0:ne-1,0:nbe-1)
       dimension  a(0:nbe-1,0:nbe-1)
       dimension  u(0:nbe-1,0:nbe-1),v(0:nbe-1,0:nbe-1)
       dimension  work(100)
       dimension  fc(0:39),dfc(0:39),ratio(0:39)
       dimension  id(0:39),sigma(0:39)
       dimension  wt(0:nbe-1)

n      = nbe
       m      = nbe
       nm     = nbe
       nbrxs  = nbe*ixsmpl nxtry  = (ne-jx0-nbe)/nbrxs-1
       nytry  = (nl-jy0-nbe)/nbrxs
       if (((nytry-1)*nbrxs +nbe).gt.nl) then
          nytry = nytry-1
       endif
       lextra = nl-nytry*nbrxs-jy0 write (iw,802) nbe,ixsmpl,iysmpl
     1 ,iform,thrsh1,power,thrsh2,coeff
 802   format (' HUI: nbe,ixsmpl,iysmpl= ',3i5,/
     1 ' thresholding formula,thrsh1,power,thrsh2,coeff = '
     2 ,/,1x,I5,4E15.5)
       write (iw,835) jx0,jy0,nxtry,nytry
 835   format (/,' HUI: jx0,jy0,nxtry,nytry',4i5)

c      skip jy0 lines if (jy0.ge.1)then
          do 840, iy = 0,jy0 -1
          irec = iy+1
          read (iui,rec=irec) (bufi(i,0),i=0,ne-1)
          write (iuo,rec=irec) (bufi(i,0),i=0,ne-1)
 840      continue
       endif c      processing the  input image block by block do 910, iy = 0,nytry-1
          line1 = jy0+1+iy*nbrxs
```

```
            do 910, iys = 0,iysmpl-1
              line2 = line1+iys c   read in nbe lines from the input image into bufi
            do 850, j = 0,nbe-1
              line1 = line2+j *iysmpl
              read (iui,rec=linei) (bufi(i,j),i=0,ne-1)

c   initialize the output buffer -- bufo do 845, jj = 0,nbe-1
            do 845, ii = 0,ne-1
            bufo(ii,jj) = 0.
845         continue
850         continue c   set up array A(i,j)

do 900, ix = 0,nxtry-1
              ixoff1 = jx0 +nbrxs*ix do 900, ixs = 0,ixsmpl-1
                ixoff2 = ixoff1+ixs+(nbe/2)*ixsmpl
                do 860, j = 0,nbe-1
                do 860, i = 0,nbe-1
                ii = ixoff2+i*ixsmpl
                a(i,j) = bufi(ii,j)
860             continue
                call svd (nm,m,n,a,sigma,.true.,u,.true.,v,ierr,work)

if (ierr.ne.0) then
                write (iw,20) ix,iy,ierr
20              format (' TROUBLE. IX,IY,IERR= ',3I6)
                do 865, l = 0,nbe-1
                   write (iw,22) l,sigma(l)
22                 format (1x,i3,'th singular value = ',E15.5)
865             continue
                do 866 i=0,ierr-1
                sigma(i)=0.
866             continue endif c   sort sigma(==singular values) in descending order call sort (nbe,sigma,id)

c   SIGMA(I,L(ID)): Ith SINGULAR VALUE

C   COMPUTE NEW A(I,J) ACCORDING TO CORING FORMULAR(IFORM) FROM
C   SIGMA, U, AND V.
            call newaij (ir,iw,nbe,id,a,sigma,u,v,fc,dfc,ratio
      1                  ,iform,thrsh1,coeff,power,thrsh2)

if (modew.eq.-1) then
              do 885, j = 0,nbe-1
              do 885, i = 0,nbe-1
                a(i,j) = a(i,j)/wt(i)/wt(j)
885           continue
            else if (modew.eq.1) then
              do 890, j = 0,nbe-1
              do 890, i = 0,nbe-1
                a(i,j) = a(i,j)*wt(i)*wt(j)
890           continue
            endif

C   UPDATE OUTPUT BUFFER : BUFO do 895, j = 0,nbe-1
              jj =j
                do 895, i = 0,nbe-1
```

```
                    ii =ixoff2+i*ixsmpl
                    bufo(ii,jj) = bufo(ii,jj)+a(i,jj)
895         continue
900     continue
c       WRITE LINES OUT TO DISK (AFTER NN LINES, MM BLOCKS ARE PROCESSED)
        do 905, j =0,nbe-1
           lineo = line2+j*iysmpl
           write (iuo,rec=lineo) (bufo(i,j),i=0,ne-1)
905     continue 910     continue
c       WRITE OUT REMAINING LINES if (lextra.gt.0) then
          line3 = nl-lextra+1
          do 915, iy = 0,lextra-1
            irec = line3+iy
            read (iui,rec=irec) (bufi(i,0),i=0,ne-1)
            write (iuo,rec=irec) (bufi(i,0),i=0,ne-1)
915       continue
        endif return
        end c------------------------------------------------------------ subroutine newaij (ir,iw,nbe,id,a,sigma,u,v,fc,dfc,ratio
       1,iform,thrsh1,coeff,power,thrsh2)

logical first
        dimension a(0:nbe-1,0:nbe-1)
        dimension sigma(0:nbe-1),id(0:nbe-1)
        dimension u(0:nbe-1,0:nbe-1),v(0:nbe-1,0:nbe-1)
        dimension fc(0:39),dfc(0:39),ratio(0:39)

data first/.true./ if(first) then
          write (iw,8888) iform,thrsh1,power,thrsh2,coeff
8888      format (' newaij: iform,t1,p,t2,c = ',i5,4f6.2)
          first=.false.
        endif do 100, j = 0,nbe-1
          do 100, i = 0,nbe-1
            a(i,j) = 0.
100     continue c       determine threshold formula if(iform.eq.0) then
          call iform0(ir,iw,nbe,id,a,sigma,u,v,fc,dfc,ratio
       1,iform,thrsh1,coeff,power,thrsh2)
          else if(iform.eq.5) then
          call iform5(ir,iw,nbe,id,a,sigma,u,v,fc,dfc,ratio
       1,iform,thrsh1,coeff,power,thrsh2)
          else if(iform.eq.6) then
          call iform6(ir,iw,nbe,id,a,sigma,u,v,fc,dfc,ratio
       1,iform,thrsh1,coeff,power,thrsh2)
        endif return
        end
c------------------------------------------------------------
```

```fortran
c       Threshold formula 0 subroutine iform0 (ir,iw,nbe,id,a,sigma,u,v,fc,dfc,ratio
     1,iform,thrsh1,coeff,power,thrsh2)

dimension a(0:nbe-1,0:nbe-1)
        dimension sigma(0:nbe-1),id(0:nbe-1)
        dimension u(0:nbe-1,0:nbe-1),v(0:nbe-1,0:nbe-1)
        dimension fc(0:39),dfc(0:39),ratio(0:39)

do 120, l = 0,nbe-1 c       depending on IFORM choose threshold level ff = 1.
          if (sigma(l).ge.0.) then
            zz = (sigma(l)-fc(l))/dfc(l)
            if (zz.le.thrsh1) then
              ff = 0.
            else if (zz.gt.thrsh1) then
                ff = 1.-thrsh2/(ratio(l)+zz)
            endif else if (sigma(l).lt.0.) then
            write (iw,505) ix,iy,l,sigma(l)
505         format (' ix,iy,l,sigma(l)',3i5,e15.5)
          endif if (ff.lt.0.) then
            ff = 0.
          else if (ff.gt.1.) then
            ff = 1.
          endif
          do 110, j = 0,nbe-1
            do 110, i = 0,nbe-1
              a(i,j) = a(i,j)+ff*sigma(l)*u(i,id(l))*v(j,id(l))
110       continue 120     continue return
        end
c------------------------------------------------------
c       Threshold formula 5 subroutine iform5 (ir,iw,nbe,id,a,sigma,u,v,fc,dfc,ratio
     1,iform,thrsh1,coeff,power,thrsh2)

dimension a(0:nbe-1,0:nbe-1)
        dimension sigma(0:nbe-1),id(0:nbe-1)
        dimension u(0:nbe-1,0:nbe-1),v(0:nbe-1,0:nbe-1)
        dimension fc(0:39),dfc(0:39),ratio(0:39)

505     format (' ix,iy,l,sigma(l)',3i5,e15.5)
        do 120, l = 0,nbe-1 c       depending on IFORM choose threshold level ff = 1.
        coefc = coeff*fc(l)
        if (sigma(l).gt.coefc) then
            ff = 1.-(coefc/sigma(l))**power
          else
          ff=0.
          if (sigma(l).lt.0.) then
              write (iw,505) ix,iy,l,sigma(l)
          endif
        endif
```

```
              if (ff.lt.0.) then
                ff = 0.
              else if (ff.gt.1.) then
c               write (iw,510) ix,iy,l,fc(l)
                ff = 1.
              endif if(ff.ne.0) then
              do 110, j = 0,nbe-1
                do 110, i = 0,nbe-1
                  a(i,j) = a(i,j)+ff*sigma(l)*u(i,id(l))*v(j,id(l))
110           continue
              endif 120     continue return
        end c-----------------------------------------------------
c       Threshold formula 6 subroutine iform6 (ir,iw,nbe,id,a,sigma,u,v,fc,dfc,ratio
       1,iform,thrsh1,coeff,power,thrsh2)

dimension a(0:nbe-1,0:nbe-1)
        dimension sigma(0:nbe-1),id(0:nbe-1)
        dimension u(0:nbe-1,0:nbe-1),v(0:nbe-1,0:nbe-1)
        dimension fc(0:39),dfc(0:39),ratio(0:39)

do 120, l = 0,nbe-1 c       depending on IFORM choose threshold level ff = 1.
          if (sigma(l).ge.0.) then
            zz = (sigma(l)-fc(l))/dfc(l)

if (zz.le.thrsh1) then
              ff = 0.
            else if (zz.gt.thrsh1) then
                yy = ratio(l)+thrsh1-thrsh2 if (yy.lt.0) then
                if (l.gt.10) then
                  write (iw,698) l,fc(l),thrsh1,thrsh2,
       1                    dfc(l),yy
698           1   format (' WARNING !!! L,FC,THRSH1,THRSH2,DFC,YY = ',
                          I5,5E15.5)
                endif
c               end of if(l.gt.10)

yy = 0.
                endif
c               end of if(yy.lt.0)

arg = coeff*((zz-thrsh1)**power)

if (arg.le.0.000000001) then
                yy = yy*(1.-arg)+thrsh2
              else if (arg.gt.0.000000001.and.arg.le.10.) then
                yy = yy*exp(-arg)+thrsh2
              else if (arg.gt.10.) then
                yy = thrsh2
              endif
c               end of arg ?

ff = 1.-(yy/(ratio(l)+zz))
            endif
c               end of (zz...
```

```
          else if (sigma(1).lt.0.) then
             write (iw,505) ix,iy,1,sigma(1)
505          format (' ix,iy,1,sigma(1)',3i5,e15.5)
          endif
c         end of (sigma(1)...

if (ff.lt.0.) then
c            write (iw,510) ix,iy,1,fc(1)
c510         format (' ix,iy,1,ff',3i5,e15.5)
             ff = 0.
          else if (ff.gt.1.) then
c            write (iw,510) ix,iy,1,fc(1)
             ff = 1.
          endif do 110, j = 0,nbe-1
            do 110, i = 0,nbe-1
              a(i,j) = a(i,j)+ff*sigma(1)*u(i,id(1))*v(j,id(1))
110        continue 120     continue
        return end
c------------------------------------------------ subroutine nfile(ir,iw,iun,nbe,ixsmpl,iysmpl,fc,dfc,ratio)

character*32       text,fname dimension fc(0:nbe-1),dfc(0:nbe-1),ratio(0:nbe-1)

text='svd noise file for   0 degree'
        call ascnam(ir,iw,text,fname)
        call ascopn(iun,fname,'old',' ')

read(iun,*) nbe,ixsmpl,iysmpl write(iw,115) fname
115     format(' noise file:',a32,/
     1  1x,'order',10x,' mean',10x,'sigma',10x,'ratio')

do 802 l=0,nbe-1
         read(iun,*) iorder,fc(l),dfc(l),ratio(l)
         write(iw,116) iorder,fc(l),dfc(l),ratio(l)
116      format(1x,i5,3e15.5)
802     continue
c               enddo        !loop l
        close(unit=iun)

return
        end
```

APPENDIX F         Copyright 1988, Eastman Kodak Company

```
c       svd_util.for
c       subroutines called by :
c                               filter.for,  convol.for, ingn.for
c                               svd_basic.for,  svd_move.for
c                               svdnoi.for, and svd_move_3ori.for
c
c       OCT-26-87
c------------------------------------------------------------------
c       subroutine svd(nm,m,n,a,w,matu,u,matv,v,ierr,rv1)
c                                               compute svd
c       sort(n,s,id)                            sort svd
c       ifile(ir,iw,iui,lform,lrec)             open input picture file
c       ofile(ir,iw,iuo,lform,lrec)             open output picture file
c       wfile(ir,iw,iuw,modew,nbe,wt,sum)       get pre/post processing weights
c       picsiz(ir,iw,mode,nc,ne,nl)             asks picture size
c       recsiz(ir,iw,ne,lform,lrec)             asks record size
c       winsiz(ir,iw,ne,nl,ixl,iyl,ixh,iyh)     asks window size
c       boxsiz(ir,iw,ix0,iy0,nx,ny)             asks box size
c       xyorig(ir,iw,ix0,iy0)                   asks xy origin
c       blksiz(ir,iw,nbe,nbl)                   asks block size
c       smplxy(ir,iw,ixsmpl,iysmpl)             asks sampling steps
c       dirnam(ir,iw,dname)                     asks directory name
c       picnam(ir,iw,nfiles,mode,fname)         asks file names
c       picopn(iu,fname,lrec,status,com)        opens a picture file
c       ascopn(iu,fname,status,com)             opens an ascii file
c       ascnam(ir,iw,text,fname)                asks an ascii file name
c       clrasc(n,text)                          clears an ascii array
c       rdlin(iu,n,buf,com,irec)                read a line
c       wrlin(iu,n,buf,com,irec)                write a line
c       ptr0(n,lp)                              pointer initialization
c       ptr(n,lp)                               update a line pointer
c       clr(n,z)                                z(i)=0
c       movxs(n,ixs,buf,pic)                    pic(i) gets sampled buf(i)
c       movxsi(n,ixs,pic,buf)                   inverse of movxs
c       mulcy(n,c,y,z)                          z(i)=z(i)+c*y(i)
c       dskdiv(iui1,iu2,lrec,buf,ne,nl,fdiv)
c                       read a line, div by const and write back
c
c------------------------------------------------------------------
c
        subroutine svd(nm,m,n,a,w,matu,u,matv,v,ierr,rv1)
        integer i,j,k,l,m,n,ii,il,kk,k1,ll,l1,mn,nm,its,ierr
        real a(nm,n),w(n),u(nm,n),v(nm,n),rv1(n)
        real c,f,g,h,s,x,y,z,scale,anorm
        logical matu,matv
c
c  this subroutine is from the book "computer methods for mathematical
c  computations" by g.e. forsythe, m.a. malcolm, and c.b. moler, 1977.
c  prentice-hall, inc., englewood cliffs, new jersey 07632. pp.229-235.
c
c  this subroutine determines the singular value decomposition
c            t
c    a=usv of a real m by n rectangular matrix. householder
c  bidiagonalization and a variant of the qr algorithm are used.
c
c  on input:
c    nm must be set to the row dimension of two-dimensional array
c    parameters as declared in the calling program dimension statement.
c    note that nm must be at least as large as the maximum of m and n.
c
c    m is the number of rows of a (and u).
c    n is the number of columns of a (and u) and the order of v.
c    a contains the rectangular array to be decomposed.
c
c    matu should be set to .true. if the u matrix in the decomposition
c    is desired, and to .false. otherwise.
```

```
c
c    matv should be set to .true. if the v matrix in the decomposition
c    is desired, and to .false. otherwise.
c
c  on output:
c    a is unaltered (unless overwritten by u or v).
c
c    w contains the n (non-negative) singular values of a (the
c    diagonal elements of s). they are unordered. if an error exit
c    is made, the singular values should be correct for indices
c    ierr+1, ierr+2, ..., n.
c
c    u contains the matrix u (orthogonal column vectors) of the
c    decomposition if matu has been set to .true. otherwise, u is
c    used as a temporary array. u may coincide with a. if an error
c    exit is made, the columns of u corresponding to indices of
c    correct singular values should be correct.
c
c    v contains the matrix v (orthogonal) of the
c    decomposition if matu has been set to .true. otherwise, v is
c    not referenced. v may also coincide with a if u is not needed.
c    if an error exit is made, the columns of v corresponding to
c    indices of correct singular values should be correct.
c
c    ierr is set to
c      zero    for normal return
c      k       if the k-th singular value has not been determined
c              after 30 iterations.
c
c    rvl is a temporary storage array.
c
      ierr=0
      do 100 j=1,n
      do 100 i=1,m
      u(i,j)=a(i,j)
100   continue
c  householder reduction to bidiagonal form
      g=0.0
      scale=0.0
      anorm=0.0
c
      do 300 i=1,n
      l=i+1
      rvl(i)=scale*g
      g=0.0
      s=0.0
      scale=0.0
      if(i.gt.m) goto 210
c
      do 120 k=i,m
120      scale=scale+abs(u(k,i))
c
      if(scale.eq.0.0) goto 210
c
      do 130 k=i,m
      u(k,i)=u(k,i)/scale
      s=s+u(k,i)**2
130      continue
c
      f=u(i,i)
      g=-sign(sqrt(s),f)
      h=f*g-s
      u(i,i)=f-g
      if(i.eq.n) goto 190
c
      do 150 j=l,n
      s=0.0
c
      do 140 k=i,m
140      s=s+u(k,i)*u(k,j)
c
```

```
      f=s/h
c
      do 150 k=i,m
      u(k,j)=u(k,j)+f*u(k,i)
150      continue
c
190      do 200 k=i,m
200      u(k,i)=scale*u(k,i)
c
210      w(i)=scale*g
      g=0.0
      s=0.0
      scale=0.0
      if(i.gt.m.or.i.eq.n) goto 290
c
      do 220 k=l,n
220      scale=scale+abs(u(i,k))
c
      if(scale.eq.0.0) goto 290
c
      do 230 k=l,n
      u(i,k)=u(i,k)/scale
      s=s+u(i,k)**2
230      continue
c
      f=u(i,l)
      g=-sign(sqrt(s),f)
      h=f*g-s
      u(i,l)=f-g
c
      do 240 k=l,n
240      rv1(k)=u(i,k)/h
c
      if(i.eq.m) goto 270
c
      do 260 j=l,m
      s=0.0
c
      do 250 k=l,n
250      s=s+u(j,k)*u(i,k)
c
      do 260 k=l,n
      u(j,k)=u(j,k)+s*rv1(k)
260      continue
c
270      do 280 k=l,n
280      u(i,k)=scale*u(i,k)
c
290      anorm=amax1(anorm,abs(w(i))+abs(rv1(i)))
300      continue
c ... accumulation of right-hand transformations .....
      if(.not.matv) goto 410
c ... for i=n step -1 until 1 do ....
      do 400 ii=1,n
      i=n+1-ii
      if(i.eq.n) goto 390
      if(g.eq.0.0) goto 360
c
      do 320 j=l,n
c ... double division avoids possible underflow ....
320      v(j,i)=(u(i,j)/u(i,l))/g
c
      do 350 j=l,n
      s=0.0
c
      do 340 k=l,n
340      s=s+u(i,k)*v(k,j)
c
      do 350 k=l,n
      v(k,j)=v(k,j)+s*v(k,i)
350      continue
```

```
c
360         do 380 j=1,n
        v(i,j)=0.0
        v(j,i)=0.0
380         continue
c
390         v(i,i)=1.0
        g=rv1(i)
        l=i
400         continue
c ... accumulation of left-hand transformations ...
410         if(.not.matu) goto 510
c ... for i=min(m,n) step -1 until 1 do ...
        mn=n
        if(m.lt.n) mn=m
c
        do 500 ii=1,mn
        i=mn+1-ii
        l=i+1
        g=w(i)
        if(i.eq.n) goto 430
c
        do 420 j=l,n
420         u(i,j)=0.0
c
430         if(g.eq.0.0) goto 475
        if(i.eq.mn) goto 460
c
        do 450 j=l,n
        s=0.0
c
        do 440 k=l,m
440         s=s+u(k,i)*u(k,j)
c ... double division avoids possible underflow
        f=(s/u(i,i))/g
c
        do 450 k=i,m
        u(k,j)=u(k,j)+f*u(k,i)
450         continue
c
460         do 470 j=i,m
470         u(j,i)=u(j,i)/g
c
        goto 490
c
475         do 480 j=i,m
480         u(j,i)=0.0
c
490         u(i,i)=u(i,i)+1.0
500         continue
c
c  diagonalization of the bidiagonal form ...
c  for k=n step -1 until 1 do ...
510         do 700 kk=1,n
        k1=n-kk
        k=k1+1
        its=0
c  test for splitting
c     for l=k step -1 until 1 do ...
520         do 530 ll=1,k
        l1=k-ll
        l=l1+1
        if(abs(rv1(l))+anorm.eq.anorm) goto 565
c  rv1(l) is always zero, so there is no exit
c     through the bottom of the loop ...
        if(abs(w(l1))+anorm.eq.anorm) goto 540
530         continue
c  cancellation of rv1(l) if l greater than 1 ...
540         c=0.0
        s=1.0
```

```
      c
            do 560 i=1,k
            f=s*rvl(i)
            rvl(i)=c*rvl(i)
            if(abs(f)+anorm.eq.anorm) goto 565
            g=w(i)
            h=sqrt(f*f+g*g)
            w(i)=h
            c=g/h
            s=-f/h
            if(.not.matu) goto 560
      c
            do 550 j=1,m
            y=u(j,l1)
            z=u(j,i)
            u(j,l1)=y*c+z*s
            u(j,i)=-y*s+z*c
  550       continue
      c
  560       continue
      c test for convergence ..
  565       z=w(k)
            if(l.eq.k) goto 650
      c shift from bottom 2x2 minor ...
            if(its.eq.30) goto 1000
            its=its+1
            x=w(l)
            y=w(kl)
            g=rvl(kl)
            h=rvl(k)
            f=((y-z)*(y+z)+(g-h)*(g+h))/(2.0*h*y)
            g=sqrt(f*f+1.0)
            f=((x-z)*(x+z)+h*(y/(f+sign(g,f))-h))/x
      c next qr transformation ...
            c=1.0
            s=1.0
      c
            do 600 il=l,kl
            i=il+1
            g=rvl(i)
            y=w(i)
            h=s*g
            g=c*g
            z=sqrt(f*f+h*h)
            rvl(il)=z
            c=f/z
            s=h/z
            f=x*c+g*s
            g=-x*s+g*c
            h=y*s
            y=y*c
            if(.not.matv) goto 575
      c
            do 570 j=1,n
            x=v(j,il)
            z=v(j,i)
            v(j,il)=x*c+z*s
            v(j,i)=-x*s+z*c
  570       continue
      c
  575       z=sqrt(f*f+h*h)
            w(il)=z
      c rotation can be arbitrary if z is zero ...
            if(z.eq.0.0) goto 580
            c=f/z
            s=h/z
  580       f=c*g+s*y
            x=-s*g+c*y
            if(.not.matu) goto 600
      c
```

```
              do 590 j=1,m
              y=u(j,i1)
              z=u(j,i)
              u(j,i1)=y*c+z*s
              u(j,i)=-y*s+z*c
590           continue
c
600           continue
c
              rv1(l)=0.0
              rv1(k)=f
              w(k)=x
              goto 520
c   convergence ...
650           if(z.ge.0.0) goto 700
c   w(k) is made non-negative ...
              w(k)=-z
              if(.not.matv) goto 700
c
              do 690 j=1,n
690           v(j,k)=-v(j,k)
c
700           continue
c
              goto 1001
c   set error .. no convergence to a singular value
c                         after 30 iterations ...
1000          ierr=k
1001          return
              end c----------------------------------------------------------------- subroutine sort(n,s,id)
              dimension s(0:49),id(0:49)
c
c       arrary id contains index of array s after sorting permutation
c
              do 20 i=0,n-1
                 id(i)=i
20            continue do 30 j=1,n-1
                 v=s(j)
                 idv=id(j)
                 do 40 i=0,j-1
                    if(v.lt.s(i)) goto 40
                    do 50 k=i,j-1
                       i1=j+i-k
                       i2=i1-1
                       s(i1)=s(i2)
                       id(i1)=id(i2)
50                  continue
                    s(i)=v
                    id(i)=idv
                    go to 30
40               continue
30            continue
              return
              end c----------------------------------------------------------------- subroutine ifile(ir,iw,iui,lform,lrec)

character*32       fnamei
```

```
        call picnam(ir,iw,1,'i',fnamei)
        call picopn(iui,fnamei,lrec,'old',' ')
c       !readonly return
        end c------------------------------------------------------------ subroutine ofile(ir,iw,iuo,lform,lrec)

character*32      fnameo call picnam(ir,iw,1,'o',fnameo)
        call picopn(iuo,fnameo,lrec,'new',' ')

return
        end c------------------------------------------------------------ subroutine wfile(ir,iw,iuw,modew,nbe,wt,sum)

character*32 text,wname dimension wt(0:nbe-1)

write(iw,402)
402     format(' weight option(-1:2)'
     1  ,/,' -1: pre weighting'
     1  ,/,'  0: no weighting'
     1  ,/,'  1: post weighting'
     1  ,/,'  2: pre and post weighting'
     1  ,/,' weight mode ?')
        read(ir,*) modew
c408       format(i)

if(modew.ne.0) then text='1-dim weight file'
        call ascnam(ir,iw,text,wname)
        call ascopn(iuw,wname,'old',' ')

read(iuw,*) nbew,idum,idum,idum,gsigma,dummy
            if(nbew.ne.nbe) then
                write(iw,*) 'nbe.ne.nbew'
                stop
            endif
        do 801 i=0,nbe-1
        read(iuw,*) iorder,wt(i)
c424        format(1x,i5,e15.5)
801        continue
c       enddo       !loop i sum=0.
        do 802 i=0,nbe-1
        sum=sum+wt(i)
802        continue
c       enddo       !loop i endif
c       !modew ?

return
        end c------------------------------------------------------------
```

```
      subroutine picsiz(ir,iw,mode,nc,ne,nl)

character*1 mode if(mode.eq.'i'.or.mode.eq.'I') then
1       write(iw,2)
2         format(' input image size: colors,elements,lines ?')
      else if(mode.eq.'o'.or.mode.eq.'O') then
        write(iw,4)
4         format(' output image size: colors,elements,lines ?')
      endif read(ir,*) nc,ne,nl write(iw,20) nc,ne,nl
20      format(' picsiz: nc,ne,nl = ',3i7)

return
      end c----------------------------------------------------------------- subroutine recsiz(ir,iw,ne,lform,lrec)

1     write(iw,10)
10      format(' format 69 or 81 or 99(sun) or 77(cray) (i) ?')
      read(ir,*) lform if(lform.eq.69) then
      lrec=ne
      else if(lform.eq.77) then
      lrec=ne*8
      else if(lform.eq.99) then
      lrec=ne*4
c       !since sun recordlength is in bytes
      else if(lform.eq.81) then
      lrec=((ne*4-1)/512+1)*512/4
c       !(ne*4) bytes
      endif
      write(iw,20) lform,lrec
20      format(' recsiz: lform = ',i5,' lrec = ',i5)

return
      end c----------------------------------------------------------- subroutine winsiz(ir,iw,ne,nl,ixl,ixh,iyl,iyh)

10     write(iw,12)
12       format(' window size: ixl,ixh,iyl,iyh ?')
      read(ir,*) ixl,ixh,iyl,iyh if(ixl.eq.0.and.ixh.eq.0) then
      ixl=0
      ixh=ne-1
      endif
c      !ixl,ixh if(iyl.eq.0.and.iyh.eq.0) then
      iyl=0
      iyh=nl-1
      endif
c      !iyl,iyh write(iw,20) ixl,ixh,iyl,iyh
20      format(' window: ixl,ixh,iyl,iyh = ',4i5)

return
      end
```

```
c------------------------------------------------ subroutine boxsiz(ir,iw,ix0,iy0,nx,ny)

write(iw,10)
10    format(' ix0,iy0,nx,ny ?')
      read(ir,*) ix0,iy0,nx,ny write(iw,20) ix0,iy0,nx,ny
20    format(' boxsiz: ix0,iy0,nx,ny = ',4i5)

return
      end c------------------------------------------------ subroutine xyorig(ir,iw,ix0,iy0)

write(iw,10)
10    format(' ix0,iy0 ?')
      read(ir,*) ix0,iy0 write(iw,20) ix0,iy0
20    format(' xyorig: ix0,iy0 = ',2i5)

return
      end c------------------------------------------------ subroutine blksiz(ir,iw,nbe,nbl)

write(iw,10)
10    format(' block size nbe,nbl ?')
      read(ir,*) nbe,nbl write(iw,20) nbe,nbl
20    format(' blksiz: nbe,nbl = ',2i5)

return
      end c------------------------------------------------ subroutine smplxy(ir,iw,ixsmpl,iysmpl)

write(iw,10)
10    format(' sampling ixsmpl,iysmpl ?')
      read(ir,*) ixsmpl,iysmpl write(iw,20) ixsmpl,iysmpl
20    format(' smplxy: ixsmpl,iysmpl = ',2i5)

return
      end c------------------------------------------------ subroutine picnam(ir,iw,nfiles,mode,fname)

character*1 mode
      character*32 fname(0:nfiles-1)

do 1 ifile=0,nfiles-1 if(mode.eq.'i'.or.mode.eq.'I') then
      write(iw,22) ifile
22    format(1x,i3,'th input picture file (a32) ?')
      else if (mode.eq.'o'.or.mode.eq.'O') then
      write(iw,24) ifile
```

```
24        format(1x,i3,'th output picture file (a32) ?')
          endif
c         !mode?

read(ir,25) fname(ifile)
25          format(a32)
1         continue return
          end c------------------------------------------------------------ subroutine picopn(iu,fname,lrec,status,com)

character*1 com
          character*3 status
          character*32 fname
          data iw/6/ if(com.eq.'s'.or.com.eq.'S') then
          open(unit=iu,file=fname,access='sequential',recl=lrec)
          else
          open(unit=iu,file=fname,access='direct',recl=lrec)
          endif write(iw,30) fname
30          format(' picopn: file = ',a32)

return
          end c------------------------------------------------------------ subroutine ascopn(iu,fname,status,com)

character*1 com
          character*3 status
          character*32 fname
          data iw/6/ open(unit=iu,file=fname)

write(iw,30) fname
30          format(' ascopn: file = ',a32)

return
          end c------------------------------------------------------------ subroutine ascnam(ir,iw,text,fname)

character*32 text,fname write(iw,10) text
10          format(1x,a32,' name (a32) ?')
          read(ir,12) fname
12          format(a32)

return
          end c------------------------------------------------------------
```

```fortran
      subroutine clrasc(n,text)

character*1 text(0:n-1)

do 1 i=0,n-1
      text(i)=' '
1       continue return
      end
``` c----------------------------------------------------------
c       read and write routines
c----------------------------------------------------------

```fortran
      subroutine rdlin(iu,n,buf,com,irec)

character*1 com
      dimension buf(0:0)

if(com.eq.'s'.or..com.eq.'S') then
      read(iu) (buf(i),i=0,n-1)
      else
      read(iu,rec=irec) (buf(i),i=0,n-1)
      endif return
      end
``` c----------------------------------------------------------

```fortran
      subroutine wrlin(iu,n,buf,com,irec)

character*1 com dimension buf(0:0)

if(com.eq.'s'.or..com.eq.'S') then
      write(iu) (buf(i),i=0,n-1)
      else
      write(iu,rec=irec) (buf(i),i=0,n-1)
      endif return
      end
``` c----------------------------------------------------------

```fortran
      subroutine ptr0(n,lp)

dimension lp(0:0)

do 1 i=0,n-1
      lp(i)=i
1       continue
c       !loop i return
      end
``` c----------------------------------------------------------

```fortran
      subroutine ptr(n,lp)

c     rotate the pointer by one
c     lp(0) will have the oldest data
c     lp(n-1) will have the newset data
c     first    lp(0)=0, lp(1)=1,lp(2)=2.lp(3)=3,....
c     then     lp(0)=1, lp(1)=2,lp(2)=3,lp(3)=4,....
```

```
      dimension lp(0:0)

ll=lp(0)
c     !save do 1 i=0,n-2
      lp(i)=lp(i+1)
1       continue
c     !enddo       !loop i lp(n-1)=ll return
      end
``` c----------------------------------------------------
c       arithmatic operation
c----------------------------------------------------

```
      subroutine addc(n,c,z)

dimension z(0:n-1)

do 1 i=0,n-1
      z(i)=z(i)+c
1       continue
c     !enddo return
      end
``` c----------------------------------------------------

```
      subroutine clr(n,z)

dimension z(0:0)

do 1 i=0,n-1
      z(i)=0.
1       continue return
      end
``` c----------------------------------------------------

```
      subroutine movxs(n,ixs,buf,pic)

dimension buf(0:0),pic(0:0)

if(ixs.eq.1) then
            do 1 i=0,n-1
            pic(i)=buf(i)
1             continue
      else
c             !sample buf and put into pic
            do 2 i=0,n-1
            pic(i)=buf(i*ixs)
2             continue
      endif return
      end
``` c----------------------------------------------------

```
      subroutine movxsi(n,ixs,pic,buf)

dimension pic(0:0),buf(0:0)
```

```
              if(ixs.eq.1) then
                   do 1 i=0,n-1
                   buf(i)=pic(i)
1         continue
              else
c                    !put pic into sampled buf
                   do 2 i=0,n-1
                   buf(i*ixs)=pic(i)
2                    continue
              endif return
              end c---------------------------------------------------- subroutine mulcy(n,c,y,z)

dimension y(0:0),z(0:0)

do 1 i=0,n-1
              z(i)=z(i)+c*y(i)
1         continue
c             !loop z return
              end c---------------------------------------------------- subroutine clrx(n,data)

dimension data(0:0)

do 1 i=0,n-1
              data(i)=0.
1         continue
c             loop i return
              end c---------------------------------------------------- subroutine dskdiv(iu1,iu2,lrec,buf,ne,nl,fdiv)

c         read a direct access file,
c         divide each pixel by fdiv and
c         write back dimension buf(0:0)

do 1 irec=1,nl
              read(iu1,rec=irec) (buf(i),i=0,ne-1)
                   do 2 i=0,ne-1
                   buf(i)=buf(i)/fdiv
2                    continue
c             loop i
              write(iu2,rec=irec) (buf(i),i=0,ne-1)
1         continue
c         loop irec return
              end
```

APPENDIX H
Copyright 1988
Eastman Kodak Company

```
c       sml_filter.for
c       generate s,m and l low-pass filters
c       output filter file names : s.msk -- 3x3
c                                  m.msk -- 5x5
c                                  l.msk -- 7x7 c       oct-26-87 character*32 fname(0:2)
        dimension s(0:8),ixsmpl(0:2),iysmpl(0:2)

data ir,iw/5,6/
        data iu,iu2/99,98/
        data s/1.,2.,1.,2.,4.,2.,1.,2.,1./
        data fname/'s.msk','m.msk','l.msk'/
        data ixsmpl/1,2,4/
        data iysmpl/1,2,4/ write(iw,10)
10      format(/,' : generates s.msk, m.msk and l.msk '
     1  ,'low pass filter files',/)
c       input sigmax=0.
        sigmay=0.
        nbe=3
        nbl=3 c       output do 90 l=0,2 open (unit=iu,file=fname(l))

write(iu,102) nbe,nbl,ixsmpl(l),iysmpl(l),sigmax,sigmay
102         format(1x,4i5,2e15.5)
            do 50 i=0,nbe*nbl-1
            write(iu,104) i,s(i)
104         format(1x,i5,e15.5)
50          continue
            close(iu)
90      continue end
```

APPENDIX G   Copyright 1988, Eastman Kodak Company
```
C       GRAIN SUPPRESSION BY SINGULAR VALUE DECOMPOSITION

C       SVD_MOVE.FOR  -- SVD WITH MOVING AVERAGE

C           link with svd_util.f

C       oct-26-87

C       maximum svd block size : 40x40 dimension  bufi(0:1999,0:39)
        dimension  bufo(0:1999,0:39)
        dimension  a(0:39,0:39),u(0:39,0:39),v(0:39,0:39)
        dimension  wt(0:39)

dimension  fc(0:39),dfc(0:39),ratio(0:39)

data ir,iw/5,6/ data iui,iuo,iun/51,52,53/
        data iuw/61/
        data a,u,v/1600*0.,1600*0.,1600*0./
        data wt/40*0./
        data fc,dfc,ratio/40*0.,40*0.,40*0./
```

```
C       NBE: # of elements per block  (BLOCK SIZE)
C       NE: number of pixels per linbe (e.g. 500 pixels)
C       NL: number of linbes of the image
c       ixsmpl,iysmpl : sampling in x and y directions c       INPUT c       define image size : nc,ne,nl
        call picsiz (ir,iw,'I',nc,ne,nl)

c       define image record size
        call recsiz (ir,iw,ne,lform,lrec)

c       open input image file
        call ifile (ir,iw,iui,lform,lrec)

c       read noise data file
        call nfile (ir,iw,iun,nbe,ixsmpl,iysmpl,fc,dfc,ratio)

c       open output image file
        call ofile (ir,iw,iuo,lform,lrec)

c       get pre/post processing weights
        call wfile (ir,iw,iuw,modew,nbe,wt,sum)

write (iw,122)
122     format (' Starting IX0,IY0 ?')
        read (ir,*) ix0,iy0 c       block orientation mode = 0 (0 or 90 degree)
        modeb=0 write (iw,140)
140     format(' idx,idy: No. of pixels to be moved '
     1,'in X and Y directions'/)
        read (ir,*)idx,idy write (iw,151)
151     format (' Threshold formula'
     1,/,' 0: HARD CLIP: (THRESHOLD1,THRESHOLD2)'
     2,/,' 5: THRESHOLD1, NOISE = -(Ni/Si)**POWER AND THRESHOLD2'
     3,/,' 6: THRESHOLD1 ,EXP(-A*X**4) AND THRESHOLD2')

write (iw,152)
52      format (' Threshold FORMULA(I) ?')
        read (ir,*) iform write (iw,162)
62      format (' THRSH1(R),POWER(R),THRSH2,COEFF(FOR 6:) ?')
        read (ir,*) thrsh1,power,thrsh2,coeff msize  = ixsmpl*(nbe-1)+1
        nbsize = ixsmpl*nbe
        nbsiz2 = ixsmpl*nbe/2
        nxmove = nbsize/idx
        nymove = nbsize/idy write (iw,202)nbe,ix0,iy0,ixsmpl,iysmpl
     1                ,msize,nbsize,idx,idy,nxmove,nymove if (modew.ne.0) then
           write (iw,204) modew,sum
        endif 202     format (' MAIN: NBE,IX0,IY0 = ',T30,3I8
     1,/,' MAIN: IXSMPL,IYSMPL = ',T30,2I8
     2,/,' MAIN: SUPPORT SIZE = ',T30,I8
     3,/,' MAIN: NBE*IXSMPL = ',T30,I8
     4,/,' MAIN: IDX,IDY = ',T30,2I8
     5,/,' MAIN: NX ,NY = ',T30,2I8)
204     format (' MODEW, SUM OF WEIGHTS = ',I5,E15.5)
```

```
      do 305, mj = 0,nymove-1
        jy0 = iy0+mj*idy
        do 305, mi = 0,nxmove-1
          jx0 = ix0+mi*idx
          mseq = mj*nxmove+mi
          call hui (nsvd,ir,iw,iui,iuo,nc,ne,nl,nbe,ixsmpl,iysmpl
     1              ,bufi,bufo,a,u,v,fc,dfc,ratio
     2              ,iform,thrsh1,coeff,power,thrsh2
     3              ,jx0,jy0,idx,idy,mseq,modew,wt,lrec)

if (mseq.eq.mseq/10*10) then
            write (iw,304) mi,mj
304         format (1X,' MAIN: BLOCK X,Y = ',2I5,' DONE')
          endif
305     continue
        write(iw,333)nsvd
333     format(1x,' *** total number of svd called : ',i10)
C       ALL THE SUM IS ACCUMULATED IN OUTPUT FILE
C       READ IT AND DIVIDE BY NXMOVE*NYMOVE denom = float(nxmove*nymove)
        if (modew.eq.1.or.modew.eq.2) then
          denom = (sum*sum*denom)/(nbe*nbe)
        endif call dskdiv (iuo,iuo,lrec,bufo,ne,nl,denom)

close (iui)
        close (iuo)

end c---------------------------------------------------------------- subroutine hui(nsvd,ir,iw,iui,iuo,nc,ne,nl,nbe,ixsmpl,iysmpl
     1              ,bufi,bufo,a,u,v,fc,dfc,ratio
     2              ,iform,thrsh1,coeff,power,thrsh2
     3              ,jx0,jy0,idx,idy,mseq,modew,wt,lrec)

c       GIVEN JX0,JY0(STARTING POINT), IT WILL MAKE IXSMPL*IYSMPL
c       MOVES OF BLOCK TRANSFORM c       THIS SUBROUTINE DOES ALL THE ACTUAL PROCESSING.
c       MAIN PROGRAM JUST SETS UP ARRAY SIZES FOR A GIVEN PICTURE.

dimension  bufi(0:ne-1,0:nbe-1)
        dimension  bufo(0:ne-1,0:nbe-1)
        dimension  a(0:nbe-1,0:nbe-1)
        dimension  u(0:nbe-1,0:nbe-1),v(0:nbe-1,0:nbe-1)
        dimension  work(100)
        dimension  fc(0:39),dfc(0:39),ratio(0:39)
        dimension  id(0:39),sigma(0:39)
        dimension  wt(0:nbe-1)

n      = nbe
        m      = nbe
        nm     = nbe
        nbrxs  = nbe*ixsmpl nxtry  = (ne-jx0-nbe)/nbrxs-1
        nytry  = (nl-jy0-nbe)/nbrxs
        if (((nytry-1)*nbrxs+nbe).gt.nl) then
          nytry = nytry-1
        endif
        lextra = nl-nytry*nbrxs-jy0 if (mseq.eq.0) then
          write (iw,802) nbe,ixsmpl,iysmpl,
     1                   iform,thrsh1,power,thrsh2,coeff
```

```
802    format (' HUI:nbe,ixsmpl,iysmpl=',3i5,/
     1        ,' thresholding formula, thrsh1,power,thrsh2,coeff = '
     2 ,/,1x,I5,4E15.5)

endif c      skip jy0 lines
       if (jy0.ge.1)then
           do 840, iy = 0,jy0-1
           irec = iy+1
           read (iui,rec=irec) (bufi(i,0),i=0,ne-1)
           write (iuo,rec=irec) (bufi(i,0),i=0,ne-1)
840        continue
       endif c      processing the  input image block by block do 910, iy = 0,nytry-1
         line1 = jy0+1+iy*nbrxs do 910, iys = 0,iysmpl-1
           line2 = line1+iys c      read in nbe lines from the input image into bufi do 850, j = 0,nbe-1
             linei = line2+j*iysmpl
             read (iui,rec=linei) (bufi(i,j),i=0,ne-1)

c      if it is a first path :
c                             initialize the output buffer  -- bufo
c                 otherwise : read in output buffer          -- bufo if (mseq.eq.0) then
               do 845, jj = 0,nbe-1
               do 845, ii = 0,ne-1
                 bufo(ii,jj) = 0.
845            continue
             else if (mseq.ne.0) then
               read (iuo,rec=linei) (bufo(i,j),i=0,ne-1)
             endif
850        continue c      set up array a(i,j)

do 900, ix = 0,nxtry-1
         ixoff1 = jx0+nbrxs*ix do 900, ixs = 0,ixsmpl-1
           ixoff2 = ixoff1+ixs+(nbe/2)*ixsmpl
             do 860, j = 0,nbe-1
             do 860, i = 0,nbe-1
             ii = ixoff2+i*ixsmpl
             a(i,j) = bufi(ii,j)
860        continue call svd (nm,m,n,a,sigma,.true.,u,.true.,v,ierr,work)
           nsvd=nsvd+1 if (ierr.ne.0) then
             write (iw,20) ix,iy,ierr
20           format (' TROUBLE. IX,IY,IERR= ',3I6)
             do 865, l = 0,nbe-1
               write (iw,22) l,sigma(l)
22             format (1x,i3,'th singular value = ',E15.5)
865          continue
             do 866 i=0,ierr-1
               sigma(i)=0.
866          continue
           endif
```

```
c       sort sigma(==singular values) in descending order call sort (nbe,sigma,id)
c
c    SIGMA(I,L(ID)): Ith SINGULAR VALUE C    COMPUTE NEW A(I,J) ACCORDING TO CORING FORMULAR(IFORM) FROM
C    SIGMA, U, AND V.

call newaij (ir,iw,nbe,id,a,sigma,u,v,fc,dfc,ratio
     1              ,iform,thrsh1,coeff,power,thrsh2)

if (modew.eq.-1) then
           do 885, j = 0,nbe-1
           do 885, i = 0,nbe-1
             a(i,j) = a(i,j)/wt(i)/wt(j)
885        continue
        else if (modew.eq.1) then
           do 890, j = 0,nbe-1
           do 890, i = 0,nbe-1
             a(i,j) = a(i,j)*wt(i)*wt(j)
890        continue
        endif

C    UPDATE OUTPUT BUFFER : BUFO do 895, j = 0,nbe-1
           jj = j
           do 895, i = 0,nbe-1
             ii = ixoff2+i*ixsmpl
             bufo(ii,jj) = bufo(ii,jj)+a(i,j)
895        continue 900     continue

C    WRITE LINES OUT TO DISK (AFTER NN LINES, MM BLOCKS ARE PROCESSED)

do 905, j = 0,nbe-1
           lineo = line2+j*iysmpl
           write (iuo,rec=lineo) (bufo(i,j),i=0,ne-1)
905     continue 910     continue

C    WRITE OUT REMAINING LINES if (lextra.gt.0) then
           line3 = nl-lextra+1
           do 915, iy = 0,lextra-1
             irec = line3+iy
             read (iui,rec=irec) (bufi(i,0),i=0,ne-1)
             write (iuo,rec=irec) (bufi(i,0),i=0,ne-1)
915        continue
        endif return
        end c-------------------------------------------------- subroutine newaij (ir,iw,nbe,id,a,sigma,u,v,fc,dfc,ratio
     1,iform,thrsh1,coeff,power,thrsh2)

logical first
        dimension a(0:nbe-1,0:nbe-1)
        dimension sigma(0:nbe-1),id(0:nbe-1)
        dimension u(0:nbe-1,0:nbe-1),v(0:nbe-1,0:nbe-1)
        dimension fc(0:39),dfc(0:39),ratio(0:39)
```

```
      data first/.true./ if(first) then
        write (iw,8888) iform,thrsh1,power,thrsh2,coeff
8888    format (' newaij: iform,t1,p,t2,c = ',i5,4f6.2)
        first=.false.
      endif do 100, j = 0,nbe-1
        do 100, i = 0,nbe-1
          a(i,j) = 0.
100   continue c     determine threshold formula if(iform.eq.0) then
        call iform0(ir,iw,nbe,id,a,sigma,u,v,fc,dfc,ratio
     1,iform,thrsh1,coeff,power,thrsh2)
      else if(iform.eq.5) then
        call iform5(ir,iw,nbe,id,a,sigma,u,v,fc,dfc,ratio
     1,iform,thrsh1,coeff,power,thrsh2)
      else if(iform.eq.6) then
        call iform6(ir,iw,nbe,id,a,sigma,u,v,fc,dfc,ratio
     1,iform,thrsh1,coeff,power,thrsh2)
      endif return
      end
c-----------------------------------------------------------------
c     Threshold formula 0 subroutine iform0 (ir,iw,nbe,id,a,sigma,u,v,fc,dfc,ratio
     1,iform,thrsh1,coeff,power,thrsh2)

dimension a(0:nbe-1,0:nbe-1)
      dimension sigma(0:nbe-1),id(0:nbe-1)
      dimension u(0:nbe-1,0:nbe-1),v(0:nbe-1,0:nbe-1)
      dimension fc(0:39),dfc(0:39),ratio(0:39)

do 120, l = 0,nbe-1 c     depending on IFORM choose threshold level
        ff = 1.
        if (sigma(l).ge.0.) then
          zz = (sigma(l)-fc(l))/dfc(l)
          if (zz.le.thrsh1) then
            ff = 0.
          else if (zz.gt.thrsh1) then
            ff = 1.-thrsh2/(ratio(l)+zz)
          endif else if (sigma(l).lt.0.) then
          write (iw,505) ix,iy,l,sigma(l)
505       format (' ix,iy,l,sigma(l)',3i5,e15.5)
        endif if (ff.lt.0.) then
          ff = 0.
        else if (ff.gt.1.) then
          ff = 1.
        endif do 110, j = 0,nbe-1
          do 110, i = 0,nbe-1
            a(i,j) = a(i,j)+ff*sigma(l)*u(i,id(l))*v(j,id(l))
110     continue 120   continue return
      end
``` c----------------------------------------------------
c       Threshold formula 5 subroutine iform5 (ir,iw,nbe,id,a,sigma,u,v,fc,dfc,ratio
     1,iform,thrsh1,coeff,power,thrsh2)

dimension a(0:nbe-1,0:nbe-1)
        dimension sigma(0:nbe-1),id(0:nbe-1)
        dimension u(0:nbe-1,0:nbe-1),v(0:nbe-1,0:nbe-1)
        dimension fc(0:39),dfc(0:39),ratio(0:39)

505     format (' ix,iy,l,sigma(l)',3i5,e15.5)

do 120, l = 0,nbe-1 c       depending on IFORM choose threshold level ff = 1.
        coefc = coeff*fc(l)
        if (sigma(l).gt.coefc) then
            ff = 1.-(coefc/sigma(l))**power
        else
            ff=0.
            if (sigma(l).lt.0.) then
                write (iw,505) ix,iy,l,sigma(l)
            endif
        endif if (ff.lt.0.) then
          ff = 0.
        else if (ff.gt.1.) then
          ff = 1.
        endif if(ff.ne.0) then
        do 110, j = 0,nbe-1
          do 110, i = 0,nbe-1
            a(i,j) = a(i,j)+ff*sigma(l)*u(i,id(l))*v(j,id(l))
110     continue
        endif 120     continue return
        end c----------------------------------------------------
c       Threshold formula 6 subroutine iform6 (ir,iw,nbe,id,a,sigma,u,v,fc,dfc,ratio
     1,iform,thrsh1,coeff,power,thrsh2)

dimension a(0:nbe-1,0:nbe-1)
        dimension sigma(0:nbe-1),id(0:nbe-1)
        dimension u(0:nbe-1,0:nbe-1),v(0:nbe-1,0:nbe-1)
        dimension fc(0:39),dfc(0:39),ratio(0:39)

do 120, l = 0,nbe-1 c       depending on IFORM choose threshold level ff = 1.
        if (sigma(l).ge.0.) then
          zz = (sigma(l)-fc(l))/dfc(l)

if (zz.le.thrsh1) then
            ff = 0.
          else if (zz.gt.thrsh1) then
            yy = ratio(l)+thrsh1-thrsh2 if (yy.lt.0) then
            if (l.gt.10) then
                write (iw,698) l,fc(l),thrsh1,thrsh2,dfc(l),yy

```
698            format (' WARNING !!! L,FC,THRSH1,THRSH2,DFC,YY =
     1            I5,5E15.5)
             endif
c             end of if(l.gt.10)

yy = 0.

endif
c            end of if(yy.lt.0)

arg = coeff*((zz-thrsh1)**power)

if (arg.le.0.000000001) then
             yy = yy*(1.-arg)+thrsh2
          else if (arg.gt.0.000000001.and.arg.le.10.) then
             yy = yy*exp(-arg)+thrsh2
          else if (arg.gt.10.) then
             yy = thrsh2
          endif
c             end of arg ?

ff = 1.-(yy/(ratio(l)+zz))
           endif
c             end of (zz...

else if (sigma(l).lt.0.) then
            write (iw,505) ix,iy,l,sigma(l)
505         format (' ix,iy,l,sigma(l)',3i5,e15.5)
         endif
c         end of (sigma(l)...

if (ff.lt.0.) then
            ff = 0.
         else if (ff.gt.1.) then
            ff = 1.
         endif do 110, j = 0,nbe-1
           do 110, i = 0,nbe-1
             a(i,j) = a(i,j)+ff*sigma(l)*u(i,id(l))*v(j,id(l))
110      continue 120   continue
      return
      end c------------------------------------------------- subroutine nfile(ir,iw,iun,nbe,ixsmpl,iysmpl,fc,dfc,ratio)

character*32    text,fname dimension fc(0:nbe-1),dfc(0:nbe-1),ratio(0:nbe-1)

text='svd noise file for   0 degree'
      call ascnam(ir,iw,text,fname)
      call ascopn(iun,fname,'old',' ')

read(iun,*) nbe,ixsmpl,iysmpl write(iw,115) fname
115      format(' noise file:',a32,/
     1 5x,'order',5x,' mean',5x,'sigma',5x,'ratio')

do 802 l=0,nbe-1
      read(iun,*) iorder,fc(l),dfc(l),ratio(l)
      write(iw,116) iorder,fc(l),dfc(l),ratio(l)
116      format(1x,i5,3e15.5)
802      continue
c         end of loop l
      close(unit=iun)
      return
      end
```

APPENDIX I   Copyright 1988, Eastman Kodak Company
C         GRAIN SUPPRESSION BY SINGULAR VALUE DECOMPOSITION C     SVD_MOVE._3ORI.F  -- SVD WITH MOVING AVERAGE and 3 ORIENTATIONS C          link with svd_util.f C     oct-26-87

C     maximum svd block size : 40x40

C     WITH THREE MODES:0--STRAIGHT
C                      1--45 DEGREE SLANT
C                      2--135 DEGREE SLANT
C     MOVING BLOCK AVERAGE
C     WITH SAMPLING IXSMPL,IYSMPL
C     IX0,IY0,AND SCALE FACTOR FOR NOISE
C     MAXIMUM BLOCK SIZE 40x40 dimension  bufi(0:1999,0:39)
      dimension  bufo(0:1999,0:39)
      dimension  a(0:39,0:39),u(0:39,0:39),v(0:39,0:39)
      dimension  wt(0:39)

dimension  iun(0:2)
      dimension  fc(0:39,0:2),dfc(0:39,0:2),ratio(0:39,0:2)

data ir,iw/5,6/ data iui,iuo,iun/51,52,53,54,55/
      data iuw/61/
      data a,u,v/1600*0.,1600*0.,1600*0./
      data wt/40*0./
      data fc,dfc,ratio/120*0.,120*0.,120*0./

C     NBE: # of elements per block   (BLOCK SIZE)
C     NE: number of pixels per linbe (e.g. 400 pixels, or 1136 pixels)
C     NL: number of linbes of the image c     INPUT c     define image size : nc,ne,nl
      call picsiz (ir,iw,'I',nc,ne,nl)

c     define image record size
      call recsiz (ir,iw,ne,lform,lrec)

c     open input image file
      call ifile (ir,iw,iui,lform,lrec)

c     read noise data files
      call nfile (ir,iw,iun,nbe,ixsmpl,iysmpl,fc,dfc,ratio)

c     open output image file
      call ofile (ir,iw,iuo,lform,lrec)

c     get pre/post processing weights
      call wfile (ir,iw,iuw,modew,nbe,wt,sum)

write (iw,122)
122   format (' Starting IX0,IY0 ?')
      read (ir,*) ix0,iy0 write (iw,140)
140   format (' NBR: No. of pixels to be replaced in the block'
     1/' IDX,IDY: No. of pixels to be moved in X and Y directions'/)

write (iw,142)
142   format (' NBR,IDX,IDY ?')
      read (ir,*) nbr,idx,idy

```
c       get block orientation mode
        write (iw,171)
171     format (' Block selection mode:'
     1,/,' 0:    0 degree'
     1,/,' 1:   45 degree'
     1,/,' 2:  135 degree'
     1,/,' 3: best of the above three'
     1,/,' MODEB ?')
        read (ir,*) modeb write (iw,151)
151     format (' Threshold formula'
     1,/,' 0: HARD CLIP: (THRESHOLD1,THRESHOLD2)'
     6,/,' 5: THRESHOLD1, NOISE = -(Ni/Si)**POWER AND THRESHOLD2'
     6,/,' 6: THRESHOLD1 ,EXP(-A*X**4) AND THRESHOLD2')

write (iw,152)
152     format (' Threshold FORMULA(I) ?')
        read (ir,*) iform write (iw,162)
162     format (' THRSH1(R),POWER(R),THRSH2,COEFF(FOR 6:) ?')
        read (ir,*) thrsh1,power,thrsh2,coeff msize  = ixsmpl*(nbe-1)+1
        nbsize = ixsmpl*nbe
        nbsiz2 = ixsmpl*nbe/2
        nxmove = nbsize/idx
        nymove = nbsize/idy write (iw,202) nbr,ix0,iy0,ixsmpl,iysmpl
     1                ,msize,nbsize,idx,idy,nxmove,nymove if (modew.ne.0) then
           write (iw,204) modew,sum
        endif 202     format (' MAIN: NBR,IX0,IY0 = ',T30,3I8
     1,/,' MAIN: IXSMPL,IYSMPL = ',T30,2I8
     1,/,' MAIN: SUPPORT SIZE = ',T30,I8
     1,/,' MAIN: NBE*IXSMPL = ',T30,I8
     1,/,' MAIN: IDX,IDY = ',T30,2I8
     2,/,' MAIN: NX ,NY  = ',T30,2I8)
204     format (' MODEW, SUM OF WEIGHTS = ',I5,E15.5)

do 305, mj = 0,nymove-1
           jy0 = iy0+mj*idy
           do 305, mi = 0,nxmove-1
              jx0 = ix0+mi*idx
              mseq = mj*nxmove+mi
              call hui (nsvd,ir,iw,iui,iuo,nc,ne,nl,nbe,ixsmpl,iysmpl
     1                 ,bufi,bufo,lp,a,u,v,fc,dfc,ratio
     2                 ,iform,thrsh1,coeff,power,thrsh2
     3                 ,jx0,jy0,idx,idy,mseq,nbr,modew,wt,lrec,modeb)

if (mseq.eq.mseq/10*10) then
                 write (iw,304) mi,mj
304              format (1X,' MAIN: BLOCK X,Y = ',2I5,' DONE')
              endif
305     continue write(iw,333)nsvd
333     format(1x,' *** total number of svd called : ',i10)

C       ALL THE SUM IS ACCUMULATED IN OUTPUT FILE
C       READ IT AND DIVIDE BY NXMOVE*NYMOVE denom = float(nxmove*nymove)
        if (modew.eq.1.or.modew.eq.2) then
           denom = (sum*sum*denom)/(nbe*nbe)
        endif
```

```
      call dskdiv (iuo,iuo,lrec,bufo,ne,nl,denom)

close (iui)
      close (iuo)
      end c------------------------------------------------------------------ subroutine hui(nsvd,ir,iw,iui,iuo,nc,ne,nl,nbe,ixsmpl,iysmpl
     1              ,bufi,bufo,lp,a,u,v,fc,dfc,ratio
     2              ,iform,thrsh1,coeff,power,thrsh2
     3              ,jx0,jy0,idx,idy,mseq,nbr,modew,wt,lrec,modeb)

c     GIVEN JX0,JY0(STARTING POINT), IT WILL MAKE IXSMPL*IYSMPL
C     MOVES OF BLOCK TRANSFORM

C     THIS SUBROUTINE DOES ALL THE ACTUAL PROCESSING.
C     MAIN PROGRAM JUST SETS UP ARRAY SIZES FOR A GIVEN PICTURE.

dimension  bufi(0:ne-1,0:nbe-1)
      dimension  bufo(0:ne-1,0:nbe-1)
      dimension  a(0:nbe-1,0:nbe-1)
      dimension  u(0:nbe-1,0:nbe-1),v(0:nbe-1,0:nbe-1)
      dimension  temps(0:39,0:2),tempu(0:39,0:39,0:2)
      dimension  tempv(0:39,0:39,0:2),idtemp(0:39,0:2)
      dimension  work(100)
      dimension  fc(0:39,0:2),dfc(0:39,0:2),ratio(0:39,0:2)
      dimension  id(0:39),sigma(0:39)
      dimension  wt(0:nbe-1)

n     = nbe
      m     = nbe
      nm    = nbe
      nbr2  = (nbe-nbr)/2
      nbr3  = nbr2+nbr
      nbrxs = nbr*ixsmpl nxtry = (ne-jx0-nbe)/nbrxs-1
      nytry = (nl-jy0-nbe)/nbrxs
      if (((nytry-1)*nbrxs+nbe).gt.nl) then
         nytry = nytry-1
      endif
      lextra = nl-nytry*nbrxs-jy0+nbr2 if (mseq.eq.0) then
         write (iw,802) modeb,nbe,nbr,ixsmpl,iysmpl,
     1                  iform,thrsh1,power,thrsh2,coeff
802      format (' HUI: modeb,nbe,nbr,ixsmpl,iysmpl=',5i5,/
     1          ,' thresholding formula, thrsh1,power,thrsh2,coeff = '
     2          ,/,1x,I5,4E15.5)
         write (iw,804) lrec,ir,iw,iui,iuo
804      format (' hui: lrec,ir,iw,iui,iuo = ',5i5)

endif
c     skip jy0 lines if ((jy0+nbr2).ge.1)then
         do 840, iy = 0,jy0+nbr2-1
         irec = iy+1
         read (iui,rec=irec) (bufi(i,0),i=0,ne-1)
         write (iuo,rec=irec) (bufi(i,0),i=0,ne-1)
840      continue
      endif c     processing the  input image block by block do 910, iy = 0,nytry-1
         line1 = jy0+1+iy*nbrxs do 910, iys = 0,iysmpl-1
            line2 = line1+iys
```

```
c     read in nbe lines from the input image into bufi do 850, j = 0,nbe-1
              linei = line2+j*iysmpl
              read (iui,rec=linei) (bufi(i,j),i=0,ne-1)

c     if it is a first path :
c                              initialize the output buffer -- bufo
c                 otherwise : read in output buffer        -- bufo if (mseq.eq.0) then
              do 845, jj = 0,nbe-1
              do 845, ii = 0,ne-1
                bufo(ii,jj) = 0.
845         continue
            else if (mseq.ne.0) then
              read (iuo,rec=linei) (bufo(i,j),i=0,ne-1)
            endif
850         continue c     set up array a(i,j)

do 900, ix = 0,nxtry-1
              ixoff1 = jx0+nbrxs*ix do 900, ixs = 0,ixsmpl-1
                ixoff2 = ixoff1+ixs if (modeb.eq.3) then
                  model1 = 0
                  model2 = 2
                else
                  model1 = modeb
                  model2 = modeb
                endif do 875, mode = model1,model2

C               COMPUTE SVD FOR 3 MODES:
C                 0 : STRAIGHT BLOCK
C                 1 : 45 DEG SLANT
C                 2 : 135 DEG SLANT if (mode.eq.0) ixoff3 = ixoff2+(nbe/2)*ixsmpl
                if (mode.eq.1) ixoff3 = ixoff2+nbe*ixsmpl
                if (mode.eq.2) ixoff3 = ixoff2
C
                if (mode.eq.0) then
                  do 860, j = 0,nbe-1
                  do 860, i = 0,nbe-1
                  ii = ixoff3+i*ixsmpl
                    a(i,j) = bufi(ii,j)
860               continue
                else if (mode.eq.1) then
                  do 861, j = 0,nbe-1
                  do 861, i = 0,nbe-1
                    ii = ixoff3+i*ixsmpl
                    a(i,j) = bufi(ii-j,j)
861             continue
                else if (mode.eq.2) then
                  do 862, j = 0,nbe-1
                  do 862, i = 0,nbe-1
                    ii = ixoff3+i*ixsmpl
                    a(i,j) = bufi(ii+j,j)
862             continue
                endif call svd (nm,m,n,a,sigma,.true.,u,.true.,v,ierr,work)
                nsvd=nsvd+1
```

```
             if (ierr.ne.0) then
                write (iw,20) ix,iy,ierr
20              format (' TROUBLE. IX,IY,IERR= ',3I6)
             do 865, l = 0,nbe-1
                write (iw,22) l,sigma(l)
22              format (1x,i3,'th singular value = ',E15.5)
865          continue
             do 866 i=0,ierr-1
                sigma(i)=0.
866          continue
             endif c      sort sigma(==singular values) in descending order call sort (nbe,sigma,id)

do 870, i = 0,nbe-1
                temps(i,mode) = sigma(i)
                idtemp(i,mode) = id(i)
870          continue
             do 871, i = 0,nbe-1
                do 871, J = 0,NBE-1
                   tempv(i,j,mode) = v(i,j)
                   tempu(i,j,mode) = u(i,j)
871          continue c
c      SIGMA(I,L(ID)): Ith SINGULAR VALUE 875          continue if (modeb.eq.0.or.modeb.eq.1.or.modeb.eq.2) then
                kmode = modeb
             else if (modeb.eq.3) then
                call bmode(iw,nbe,temps,fc,dfc,kmode)
             else
                write (iw,*) ' HUI:MODEB IS NOT RIGHT'
                stop
             endif do 880, i = 0,nbe-1 sigma(i) = temps(i,kmode)
             id(i) = idtemp(i,kmode)
             do 880, j = 0,nbe-1
                u(i,j) = tempu(i,j,kmode)
                v(i,j) = tempv(i,j,kmode)
880          continue C      COMPUTE NEW A(I,J) ACCORDING TO CORING FORMULAR(IFORM) FROM
C      SIGMA, U, AND V.

call newaij (ir,iw,nbe,id,a,sigma,u,v,fc,dfc,ratio
     1                  ,iform,thrsh1,coeff,power,thrsh2,kmode)

if (modew.eq.-1) then
                do 885, j = 0,nbe-1
                do 885, i = 0,nbe-1
                   a(i,j) = a(i,j)/wt(i)/wt(j)
885             continue
             else if (modew.eq.1) then
                do 890, j = 0,nbe-1
                do 890, i = 0,nbe-1
                   a(i,j) = a(i,j)*wt(i)*wt(j)
890             continue
             endif

C      UPDATE OUTPUT BUFFER : BUFO
C      REPLACE NBR LINES AND ELEMENTS.

C      NBR2 = (NBE-NBR)/2,NBR3=NBR2+NBR
```

```
          if(nbr.le.nbe/2) then
            ixoff4 = ixoff2+(nbe/2)*ixsmpl+nbr2*ixsmpl
              if (kmode.eq.0) then
              do 895, j = 0,nbr-1
                jj = nbr2+j
                do 895, i = 0,nbr-1
                ii = ixoff4+i*ixsmpl
                  bufo(ii,jj) = bufo(ii,jj)+a(nbr2+i,jj)
895       continue
              else if (kmode.eq.1) then
              do 896, j = 0,nbr-1
                jj = nbr2+j
                do 896, i = 0,nbr-1
                ii = ixoff4+i*ixsmpl
                  bufo(ii,jj) = bufo(ii,jj)+a(nbe/2-nbr+i+j,jj)
896       continue
              else if (kmode.eq.2) then
              do 897, j = 0,nbr-1
                jj = nbr2+j
                do 897, i = 0,nbr-1
                ii = ixoff4+i*ixsmpl
                  bufo(ii,jj) = bufo(ii,jj)+a(nbe/2+i-j,jj)
897       continue
              endif
c             end of kmode ?

else if(nbr.eq.nbe) then
            if (kmode.eq.0) then
              ixoff4=ixoff2+(nbe/2)*ixsmpl
              do 995, j = 0,nbr-1
              jj = nbr2+j
              do 995, i = 0,nbr-1
              ii = ixoff4+i*ixsmpl
                bufo(ii,jj) = bufo(ii,jj)+a(i,j)
995       continue
            else if (kmode.eq.1) then
              ixoff4=ixoff2+nbe*ixsmpl
              do 996, j = 0,nbr-1
              jj = nbr2+j
              do 996, i = 0,nbr-1
              ii = ixoff4+i*ixsmpl
                bufo(ii-j,jj) = bufo(ii-j,jj)+a(i,j)
996       continue
            else if (kmode.eq.2) then
              ixoff4=ixoff2
              do 997, j = 0,nbr-1
              jj = nbr2+j
              do 997, i = 0,nbr-1
              ii = ixoff4+i*ixsmpl
                bufo(ii+j,jj) = bufo(ii+j,jj)+a(i,j)
997       continue
            endif
c             end of kmode ?
          else
          write(iw,*) ' nbr should be .le.(nbe/2).or .eq.nbe'
          stop
          endif
c         end of nbr ?

900   continue

C     WRITE LINES OUT TO DISK (AFTER NN LINES, MM BLOCKS ARE PROCESSED)

do 905, j = nbr2,nbr3-1
          lineo = line2+j*iysmpl
          write (iuo,rec=lineo) (bufo(i,j),i=0,ne-1)
905     continue 910   continue
```

```
C     WRITE OUT REMAINING LINES
         if (lextra.gt.0) then
            line3 = nl-lextra+1
            do 915, iy = 0,lextra-1
               irec = line3+iy
               read (iui,rec=irec) (bufi(i,0),i=0,ne-1)
               write (iuo,rec=irec) (bufi(i,0),i=0,ne-1)
915         continue
         endif return
         end c----------------------------------------------------------- subroutine newaij (ir,iw,nbe,id,a,sigma,u,v,fc,dfc,ratio
        1,iform,thrsh1,coeff,power,thrsh2,kmode)

logical first
         dimension a(0:nbe-1,0:nbe-1)
         dimension sigma(0:nbe-1),id(0:nbe-1)
         dimension u(0:nbe-1,0:nbe-1),v(0:nbe-1,0:nbe-1)
         dimension fc(0:39,0:2),dfc(0:39,0:2),ratio(0:39,0:2)

data first/.true./ if(first) then
            write (iw,8888) iform,thrsh1,power,thrsh2,coeff,kmode
8888        format (' newaij: iform,t1,p,t2,c,kmode = ',i5,4f6.2,i5)
            first=.false.
         endif do 100, j = 0,nbe-1
            do 100, i = 0,nbe-1
               a(i,j) = 0.
100      continue if(iform.eq.0) then
            call iform0(ir,iw,nbe,id,a,sigma,u,v,fc,dfc,ratio
        1,iform,thrsh1,coeff,power,thrsh2,kmode)
         else if(iform.eq.5) then
            call iform5(ir,iw,nbe,id,a,sigma,u,v,fc,dfc,ratio
        1,iform,thrsh1,coeff,power,thrsh2,kmode)
         else if(iform.eq.6) then
            call iform6(ir,iw,nbe,id,a,sigma,u,v,fc,dfc,ratio
        1,iform,thrsh1,coeff,power,thrsh2,kmode)
         endif return
         end
c-----------------------------------------------------------
         subroutine iform0 (ir,iw,nbe,id,a,sigma,u,v,fc,dfc,ratio
        1,iform,thrsh1,coeff,power,thrsh2,kmode)

dimension a(0:nbe-1,0:nbe-1)
         dimension sigma(0:nbe-1),id(0:nbe-1)
         dimension u(0:nbe-1,0:nbe-1),v(0:nbe-1,0:nbe-1)
         dimension fc(0:39,0:2),dfc(0:39,0:2),ratio(0:39,0:2)

do 120, l = 0,nbe-1
```

```
c       depending on IFORM choose threshold level ff = 1.
        if (sigma(l).ge.0.) then
           zz = (sigma(l)-fc(l,kmode))/dfc(l,kmode)
           if (zz.le.thrsh1) then
              ff = 0.
           else if (zz.gt.thrsh1) then
              ff = 1.-thrsh2/(ratio(l,kmode)+zz)
           endif else if (sigma(l).lt.0.) then
           write (iw,505) ix,iy,l,sigma(l)
505        format (' ix,iy,l,sigma(l)',3i5,e15.5)
        endif if (ff.lt.0.) then
c          write (iw,510) ix,iy,l,fc(l,kmode)
c510       format (' ix,iy,l,ff',3i5,e15.5)
           ff = 0.
        else if (ff.gt.1.) then
c          write (iw,510) ix,iy,l,fc(l,kmode)
           ff = 1.
        endif do 110, j = 0,nbe-1
          do 110, i = 0,nbe-1
            a(i,j) = a(i,j)+ff*sigma(l)*u(i,id(l))*v(j,id(l))
110     continue 120   continue
      return
      end c----------------------------------------------------------- subroutine iform5 (ir,iw,nbe,id,a,sigma,u,v,fc,dfc,ratio
     1,iform,thrsh1,coeff,power,thrsh2,kmode)

dimension a(0:nbe-1,0:nbe-1)
        dimension sigma(0:nbe-1),id(0:nbe-1)
        dimension u(0:nbe-1,0:nbe-1),v(0:nbe-1,0:nbe-1)
        dimension fc(0:39,0:2),dfc(0:39,0:2),ratio(0:39,0:2)

do 120, l = 0,nbe-1 c       depending on IFORM choose threshold level ff = 1.
        coefc = coeff*fc(l,kmode)
        if (sigma(l).gt.coefc) then
           ff = 1.-(coefc/sigma(l))**power
           else
           ff=0.
           if (sigma(l).lt.0.) then
           write (iw,505) ix,iy,l,sigma(l)
505        format (' ix,iy,l,sigma(l)',3i5,e15.5)
           endif
        endif if (ff.lt.0.) then
           ff = 0.
        else if (ff.gt.1.) then
           ff = 1.
        endif if(ff.ne.0) then
        do 110, j = 0,nbe-1
          do 110, i = 0,nbe-1
            a(i,j) = a(i,j)+ff*sigma(l)*u(i,id(l))*v(j,id(l))
```

```
110     continue
        endif 120     continue return
        end c------------------------------------------------ subroutine iform6 (ir,iw,nbe,id,a,sigma,u,v,fc,dfc,ratio
       1,iform,thrsh1,coeff,power,thrsh2,kmode)

dimension a(0:nbe-1,0:nbe-1)
        dimension sigma(0:nbe-1),id(0:nbe-1)
        dimension u(0:nbe-1,0:nbe-1),v(0:nbe-1,0:nbe-1)
        dimension fc(0:39,0:2),dfc(0:39,0:2),ratio(0:39,0:2)

do 120, l = 0,nbe-1 c       depending on IFORM choose threshold level ff = 1.
        if (sigma(l).ge.0.) then
           zz = (sigma(l)-fc(l,kmode))/dfc(l,kmode)

if (zz.le.thrsh1) then
             ff = 0.
           else if (zz.gt.thrsh1) then
              yy = ratio(l,kmode)+thrsh1-thrsh2 if (yy.lt.0) then
              if (l.gt.10) then
                 write (iw,698) l,fc(l,kmode),thrsh1,thrsh2,
       1                     dfc(l,kmode),yy
698    1         format (' WARNING !!! L,FC,THRSH1,THRSH2,DFC,YY =
                     I5,5E15.5)
              endif
c             end of if(l.gt.10)

yy = 0.
              endif
c             end of if(yy.lt.0)

arg = coeff*((zz-thrsh1)**power)

if (arg.le.0.000000001) then
                 yy = yy*(1.-arg)+thrsh2
              else if (arg.gt.0.000000001.and.arg.le.10.) then
                 yy = yy*exp(-arg)+thrsh2
              else if (arg.gt.10.) then
                 yy = thrsh2
              endif
c             end of arg ?

ff = 1.-(YY/(RATIO(L,KMODE)+zz))
           endif
c          end of (zz...

else if (sigma(l).lt.0.) then
            ff=0.
            write (iw,505) ix,iy,l,sigma(l)
505         format (' ix,iy,l,sigma(l)',3i5,e15.5)
        endif
c       end of (sigma(l)...

if (ff.lt.0.) then
           ff = 0.
        else if (ff.gt.1.) then
```

```
c            write (iw,510) ix,iy,l,fc(l,kmode)
             ff = 1.
           endif do 110, j = 0,nbe-1
             do 110, i = 0,nbe-1
               a(i,j) = a(i,j)+ff*sigma(l)*u(i,id(l))*v(j,id(l))
110        continue 120     continue
           return
         end c-------------------------------------------------- subroutine bmode (iw,nbe,temps,fc,dfc,kmode)

c       SELECT THE MODE WHICH IS THE BEST dimension temps(0:39,0:2)
         dimension fc(0:39,0:2),dfc(0:39,0:2)
         dimension lzero(0:2),modeid(0:2)
         dimension zval(0:2)

c       GET THE ORDER WHICH IS CLOSE TO NOISE VALUE do 110, mode = 0,2
           lzero(mode) = 0
           do 100, l = 0,nbe-1
             zz = (temps(l,mode)-fc(l,mode))/dfc(l,mode)
             if (abs(zz).lt.3.5) then
                 lzero(mode) = l
                 go to 110
             endif
100        continue
110     continue c       DETERMINE THE MODE WHICH HAS THE LOWEST ORDER
c       SEE IF ANY OF THE TWO ARE THE SAME lmin = nbe-1
         do 120, mode = 0,2
           if (lzero(mode).le.lmin) then
             lmin = lzero(mode)
           endif
120     continue lflag = 0
         do 130, mode = 0,2
           if (lzero(mode).eq.lmin) then
             modeid(lflag) = mode
             lflag = lflag+1
           endif
130     continue if (lflag.eq.1) then
           kmode = modeid(0)

else if (lflag.eq.2) then
           call clrx(2,zval)
           do 140, k = 0,1
             kk = modeid(k)
             do 140, i = 0,1
               zval(k) = zval(k)+(temps(i,kk)-fc(i,kk))/dfc(i,kk)
140        continue kmode = modeid(0)
           if (zval(1).gt.zval(0)) kmode = modeid(1)
```

```
      else if (lflag.eq.3) then if (modeid(0).eq.0) then
            kmode = 0 else if (modeid(0).eq.1) then zmax = -999.
            kmode = -1
            do 150, k = 0,2
               zz = (temps(0,k)-fc(0,k))/dfc(0,k)
               if (zz.gt.zmax) then
                  kmode = k
               endif
150         continue else
            call clrx(3,zval)
            do 160, k = 0,2
               do 160, l = 0,1
                  zval(k) = zval(k)+(temps(l,k)-fc(l,k))/dfc(l,k)
160         continue zmax = -999.
            kmode = -1
            do 165, k = 0,2
               if (zval(k).gt.zmax) then
                  kmode = k
               endif
165         continue endif if (kmode.eq.-1) then
            write (iw,170) (zval(k),k = 0,2)
170         format (' WARNING !!! BMODE: LFLAG = 3, ZVAL =',3F10.2)
            kmode = 0
         endif endif return
      end c------------------------------------------------- subroutine norm(ne,nl,buf,denom)

dimension buf(0:ne-1,0:nl-1)

do 1 j=0,nl-1
      do 1 i=0,ne-1
      buf(i,j)=buf(i,j)/denom
1     continue return
      end
c------------------------------------------------- subroutine nfile(ir,iw,iun,nbe,ixsmpl,iysmpl,fc,dfc,ratio)

character*32      text,fname(0:2)

dimension fc(0:nbe-1,0:2),dfc(0:nbe-1,0:2),ratio(0:nbe-1,0:2)
      dimension iun(0:2)
c     dimension mode(0:2)

text='svd noise file for   0 degree'
      call ascnam(ir,iw,text,fname(0))
      call ascopn(iun(0),fname(0),'old',' ')
```

```
            text='svd noise file for  45 degree'
            call ascnam(ir,iw,text,fname(1))
            call ascopn(iun(1),fname(1),'old',' ')

text='svd noise file for 135 degree'
            call ascnam(ir,iw,text,fname(2))
            call ascopn(iun(2),fname(2),'old',' ')

do 801 ifile=0,2
            read(iun(ifile),*) nbe,ixsmpl,iysmpl
c114           format(3i)
            write(iw,115) fname(ifile)
115            format(' noise file:',a32,/
     1 5x,'order',5x,' mean',10x,'sigma',5x,'ratio')

do 802 1=0,nbe-1
            read(iun(ifile),*) iorder
     1,fc(l,ifile),dfc(l,ifile),ratio(l,ifile)
            write(iw,116) iorder,fc(l,ifile),dfc(l,ifile),ratio(l,ifile)
116            format(1x,i5,3e15.5)
802         continue
c              end of loop 1
            close(unit=iun(ifile))

801         continue
c           end of loop ifile return
            end
```

We claim:

1. A method of processing an image in a digital computer for reducing noise in the image, comprising the steps of:
   (a) generating a nonlinear gain function based upon the measured statistics of the SVD singular values for image noise;
   (b) filtering the digital image to produce a detail image and a low pass filtering image;
   (c) dividing the detail image into blocks;
   (d) transforming the blocks employing an SVD transformation to produce singular vectors and arrays of singular values;
   (e) applying the nonlinear gain function to the arrays of singular values to produce arrays of modified singular values;
   (f) performing an inverse SVD on the singular vectors with modified singular values to produce blocks of processed detail image values; and
   (g) combining the processed image detail values with the low pass filtered image values to produce the processed digital image.

2. The method of processing a digital image claimed in claim 1, wherein said step of generating a nonlinear gain function comprises the steps of:
   (a) producing a noise digital image having only a noise component;
   (b) filtering the noise digital image to produce a noise detail and a low pass filtered noise image;
   (c) dividing the noise detail image into a plurality of blocks;
   (d) performing an SVD transformation on the blocks of the noise detail image to produce singular vectors and an array of singular values for each block;
   (e) calculating the means and standard deviations for respective singular values of the blocks; and
   (f) generating a nonlinear gain function for each of the singular values based upon the respective means and standard deviations.

3. The method of processing a digital image claimed in claim 1, further including the steps of:
   (a) operating the method in a plurality of stages, wherein each stage employs blocks overlapping with blocks of another stage; and
   (b) generating the processed digital image from the average values of the processed image values from the overlapping blocks, whereby the processed image is generated without visible block structure.

4. The method of processing a digital image claimed in claim 1, further including the step of:
   operating the method in a hierarchy of stages, wherein each stage employs an image detail signal representing a different pass band of spatial frequencies, and generating the process digital image by combining the processed sources characterized by different spatial frequency content is effectively removed from the image.

5. The method of processing a digital image claimed in claim 4, further including the steps of:
   (a) operating the method in a plurality of stages, wherein each stage employs blocks overlapping with blocks of another stage; and
   (b) generating the processed digital image from the average values of the processed image values from the overlapping blocks, whereby the processed image is generated without a visible block-like structure.

6. The method of processing a digital image claimed in claim 1, further including the steps of:
   (a) dividing the detail image into blocks having diagonally oriented edges;
   (b) performing the SVD transform on the diagonally oriented blocks; and
   (c) employing the blocks having the highest singular values for processing the image.

7. The method of processing a digital image claimed in claim 1, wherein the digital image is a color digital image, and wherein the method is applied to each color component of the digital image to produce a processed color digital image.

8. The method of processing a digital image claimed in claim 1, wherein the image is a color digital image having a luminance component and two color components, wherein the method is applied to the luminance component of the digital image to produce a processed color digital image.

* * * * *